United States Patent
Li et al.

(10) Patent No.: US 11,553,470 B2
(45) Date of Patent: Jan. 10, 2023

(54) BEAM MANAGEMENT FOR HIGH-PATHLOSS MODE OPERATIONS

(71) Applicant: QUALCOMM Incorporated, San Diego, CA (US)

(72) Inventors: Junyi Li, Chester, NJ (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/806,984

(22) Filed: Mar. 2, 2020

(65) Prior Publication Data

US 2020/0337028 A1     Oct. 22, 2020

Related U.S. Application Data

(60) Provisional application No. 62/835,402, filed on Apr. 17, 2019.

(51) Int. Cl.
*H04W 4/00* (2018.01)
*H04W 72/04* (2009.01)

(52) U.S. Cl.
CPC ..... *H04W 72/042* (2013.01); *H04W 72/0446* (2013.01)

(58) Field of Classification Search
CPC .............. H04W 72/024; H04W 76/11; H04W 72/0453; H04W 76/19; H04W 76/27; H04W 72/14
See application file for complete search history.

(56) References Cited

U.S. PATENT DOCUMENTS 7,016,649 B1    3/2006  Narasimhan et al.
8,327,002 B1*  12/2012  Van Dussen ............ H04L 41/00
                                                   709/228

(Continued)

FOREIGN PATENT DOCUMENTS

EP      1515471 A1    3/2005
EP      2120364 A1    11/2009

(Continued)

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8,2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".

(Continued)

*Primary Examiner* — Abdelnabi O Musa
(74) *Attorney, Agent, or Firm* — Holland & Hart LLP/Qualcomm Incorporated

(57) ABSTRACT

Methods, systems, and devices for wireless communications are described. When operating in a high-pathloss mode, wireless devices in a network may transmit or receive downlink control information (DCI) that schedules a transmission time interval (TTI) for a physical shared channel (such as a physical uplink shared channel (PUSCH) or a physical downlink shared channel (PDSCH)). A wireless device may determine one or more intervals that correspond to a periodic signal that collides with portions of the TTI. Based on the identified intervals, the wireless device may communicate over the physical shared channel during the (Continued)

TTI. In such cases, the TTI may overlap in time with the one or more intervals to allow communication of the periodic signal during the portions of the TTI. For instance, a periodic signal may be transmitted or received during each of the one or more intervals.

49 Claims, 16 Drawing Sheets

(56) References Cited

U.S. PATENT DOCUMENTS

| | | | |
|---|---|---|---|
| 9,319,886 | B2 | 4/2016 | Jo et al. |
| 9,877,322 | B1 | 1/2018 | Sung et al. |
| 10,736,054 | B2 | 8/2020 | Jiang et al. |
| 2005/0106910 | A1 | 5/2005 | Chiu |
| 2006/0285504 | A1 | 12/2006 | Dong et al. |
| 2008/0268786 | A1 | 10/2008 | Baker et al. |
| 2009/0046653 | A1 | 2/2009 | Singh et al. |
| 2009/0210474 | A1 | 8/2009 | Shao et al. |
| 2010/0113041 | A1 | 5/2010 | Bienas et al. |
| 2010/0329195 | A1 | 12/2010 | Abraham et al. |
| 2010/0331030 | A1 | 12/2010 | Nory et al. |
| 2011/0085502 | A1 | 4/2011 | Malladi |
| 2011/0249578 | A1 | 10/2011 | Nayeb Nazar et al. |
| 2012/0157108 | A1 | 6/2012 | Boudreau et al. |
| 2013/0003788 | A1 | 1/2013 | Marinier et al. |
| 2013/0265916 | A1 | 10/2013 | Zhu et al. |
| 2013/0301454 | A1 | 11/2013 | Seol et al. |
| 2014/0071954 | A1 | 3/2014 | Au et al. |
| 2014/0098761 | A1 | 4/2014 | Lee et al. |
| 2014/0105136 | A1 | 4/2014 | Tellado et al. |
| 2014/0206382 | A1 | 7/2014 | Shabtay |
| 2014/0254537 | A1 | 9/2014 | Kim et al. |
| 2014/0274141 | A1 | 9/2014 | Gholmieh et al. |
| 2014/0362716 | A1 | 12/2014 | Zhang et al. |
| 2015/0011236 | A1 | 1/2015 | Kazmi et al. |
| 2015/0365939 | A1 | 12/2015 | Zhang et al. |
| 2016/0066301 | A1 | 3/2016 | Zhu et al. |
| 2016/0088648 | A1 | 3/2016 | Xue et al. |
| 2016/0270116 | A1* | 9/2016 | Lin ................... H04W 72/1289 |
| 2016/0295595 | A1 | 10/2016 | Chae et al. |
| 2016/0308280 | A1 | 10/2016 | Shimizu |
| 2016/0315686 | A1 | 10/2016 | Song et al. |
| 2017/0034837 | A1 | 2/2017 | Lopez-Perez et al. |
| 2017/0070961 | A1 | 3/2017 | Bharadwaj et al. |
| 2017/0086080 | A1 | 3/2017 | Sun et al. |
| 2017/0093038 | A1 | 3/2017 | Li et al. |
| 2017/0215201 | A1* | 7/2017 | Kim ................... H04L 1/1812 |
| 2017/0265169 | A1* | 9/2017 | Chen ................... H04W 72/042 |
| 2017/0290008 | A1* | 10/2017 | Tooher ................... H04L 1/1893 |
| 2017/0310426 | A1 | 10/2017 | Fan et al. |
| 2017/0325164 | A1* | 11/2017 | Lee ................... H04W 76/28 |
| 2018/0020452 | A1 | 1/2018 | Yerramalli et al. |
| 2018/0042031 | A1 | 2/2018 | Hampel et al. |
| 2018/0049137 | A1 | 2/2018 | Li et al. |
| 2018/0054339 | A1 | 2/2018 | Sun et al. |
| 2018/0092073 | A1 | 3/2018 | Nogami et al. |
| 2018/0124790 | A1 | 5/2018 | Yerramalli |
| 2018/0132197 | A1 | 5/2018 | Lin et al. |
| 2018/0145798 | A1 | 5/2018 | Suzuki et al. |
| 2018/0145819 | A1 | 5/2018 | Axmon et al. |
| 2018/0198181 | A1 | 7/2018 | Fukasawa |
| 2018/0220465 | A1 | 8/2018 | Zhang et al. |
| 2018/0234337 | A1* | 8/2018 | Goliya ................... H04L 45/58 |
| 2018/0242264 | A1 | 8/2018 | Pelletier et al. |
| 2018/0249492 | A1 | 8/2018 | Xu et al. |
| 2018/0324716 | A1 | 11/2018 | Jeon et al. |
| 2018/0324853 | A1 | 11/2018 | Jeon et al. |
| 2018/0367263 | A1 | 12/2018 | Ying et al. |
| 2018/0375619 | A1* | 12/2018 | Hwang ............. H04W 72/0446 |
| 2019/0007181 | A1 | 1/2019 | Marinier et al. |
| 2019/0044639 | A1 | 2/2019 | Ouchi et al. |
| 2019/0044647 | A1 | 2/2019 | Tomeba et al. |
| 2019/0053072 | A1 | 2/2019 | Kundargi et al. |
| 2019/0053205 | A1 | 2/2019 | Tomeba et al. |
| 2019/0082457 | A1 | 3/2019 | Zhou et al. |
| 2019/0089498 | A1 | 3/2019 | Pelletier et al. |
| 2019/0116605 | A1 | 4/2019 | Luo et al. |
| 2019/0182870 | A1 | 6/2019 | Shih et al. |
| 2019/0208538 | A1 | 7/2019 | Lee et al. |
| 2019/0215766 | A1 | 7/2019 | Wu et al. |
| 2019/0215896 | A1 | 7/2019 | Zhou et al. |
| 2019/0253136 | A1 | 8/2019 | Makki et al. |
| 2019/0260495 | A1 | 8/2019 | Nammi |
| 2019/0288765 | A1 | 9/2019 | Lee et al. |
| 2019/0313406 | A1 | 10/2019 | Liu et al. |
| 2019/0327123 | A1 | 10/2019 | Wang et al. |
| 2020/0015209 | A1 | 1/2020 | Zhang |
| 2020/0107335 | A1 | 4/2020 | Xue et al. |
| 2020/0107355 | A1 | 4/2020 | Zhou |
| 2020/0145860 | A1 | 5/2020 | Koskela et al. |
| 2020/0146059 | A1 | 5/2020 | Cirik et al. |
| 2020/0288409 | A1 | 9/2020 | Li |
| 2020/0296673 | A1 | 9/2020 | Ouchi et al. |
| 2020/0328850 | A1* | 10/2020 | Feng ................... H04L 5/14 |
| 2020/0336920 | A1 | 10/2020 | Li et al. |
| 2020/0336942 | A1 | 10/2020 | Li et al. |
| 2020/0336946 | A1 | 10/2020 | Li et al. |
| 2020/0336994 | A1 | 10/2020 | Li et al. |
| 2020/0337004 | A1 | 10/2020 | Li et al. |
| 2021/0022091 | A1 | 1/2021 | Li et al. |
| 2021/0037441 | A1 | 2/2021 | Khalid et al. |
| 2021/0136639 | A1 | 5/2021 | Osawa |
| 2021/0168782 | A1 | 6/2021 | Hamidi-Sepehr et al. |
| 2021/0195674 | A1 | 6/2021 | Park et al. |
| 2021/0204307 | A1* | 7/2021 | Lee ................... H04W 72/1242 |

FOREIGN PATENT DOCUMENTS

| | | | |
|---|---|---|---|
| EP | | 2504942 A1 | 10/2012 |
| EP | | 3179660 A1 | 6/2017 |
| KR | | 20180136855 A | 12/2018 |
| WO | WO-2016040290 A1 | | 3/2016 |
| WO | WO-2019070579 A1 | | 4/2019 |

OTHER PUBLICATIONS

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Retrieved from the Internet: URL: http://www.3gpp.org/ftp/Meetings%5F3GPP%5FSYNC/RAN1/Docs/ [retrieved on Apr. 15, 2018] Sections 2.1 and 2.2.

International Search Report and Written Opinion—PCT/US2020/020828—ISAEPO—dated May 29, 2020 (192019WO).

LG Electronics: "Discussions on Mechanisms to Support NR IAB Scenarios," 3GPP Draft, 3GPP TSG RAN WG1 Meeting #94bis, R1-1810273, Discussions on NR IAB Support_V0, 3rd Generation Partnership Project, (3gpp), Mobile Competence Centre ; 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517687, 7 pages, Retrieved from the Internet: URL: http://www.3gpp.org/ftp/tsg%5Fran/WG1%5FRL1/TSGR1%5F94b/Docs/R1%2D1810273%2Ezip [retrieved on Sep. 29, 2018] Chapter 6 "Access and backhaul Timing," Chapter 7 "TDM Patterns".

QUALCOMM Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), XP051463086, 8 Pages, Retrieved from the Internet: URL: http://www.3gpp.org/ftp/tsg%5Fran/WG1%5FRL1/TSGR1%5F93/Docs, [retrieved on May 12, 2018], paragraph [0003].

(56) References Cited

OTHER PUBLICATIONS

QUALCOMM Incorporated: "Resource Allocation for PUCCH", 3GPP Draft, 3GPP TSG RAN WG1 Meeting #90b, R1-1718806 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 pages, Retrieved from the Internet: URL: http://www.3gpp.org/ftp/Meetings_3GPP_SYNC/RAN1/Docs/, [retrieved on Oct. 8, 2017], paragraph [0002].

* cited by examiner

BEAM MANAGEMENT FOR HIGH-PATHLOSS MODE OPERATIONS

CROSS REFERENCE

The present application for patent claims the benefit of U.S. Provisional Patent Application No. 62/835,402 by Li et al., entitled "BEAM MANAGEMENT FOR HIGH-PATHLOSS MODE OPERATIONS," filed Apr. 17, 2019, assigned to the assignee hereof, and expressly incorporated by reference herein in its entirety.

INTRODUCTION

The following relates to wireless communications, and more specifically to beam management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a device in a wireless network is described. The method may include receiving a physical downlink control channel (PDCCH) including downlink control information (DCI) that schedules a transmission time interval (TTI) for a physical shared channel. The method may include determining one or more intervals that correspond to a periodic signal that collides with portions of the TTI. The method may further include communicating over the physical shared channel during the TTI, the TTI overlapping in time with the one or more intervals to allow communication of the periodic signal during the portions of the TTI.

An apparatus for wireless communications at a device in a wireless network is described. The apparatus may include a processor and memory coupled to the processor. The processor and memory may be configured to receive a PDCCH including DCI that schedules a TTI for a physical shared channel. The processor and memory may be configured to determine one or more intervals that correspond to a periodic signal that collides with portions of the TTI. The processor and memory may be configured to communicate over the physical shared channel during the TTI, the TTI overlapping in time with the one or more intervals to allow communication of the periodic signal during the portions of the TTI.

Another apparatus for wireless communications at a device in a wireless network is described. The apparatus may include means for receiving a PDCCH including DCI that schedules a TTI for a physical shared channel. The apparatus may include means for determining one or more intervals that correspond to a periodic signal that collides with portions of the TTI. The apparatus may include means for communicating over the physical shared channel during the TTI, the TTI overlapping in time with the one or more intervals to allow communication of the periodic signal during the portions of the TTI.

A non-transitory computer-readable medium storing code for wireless communications at a device in a wireless network is described. The code may include instructions executable by a processor to receive a PDCCH including DCI that schedules a TTI for a physical shared channel. The code may include instructions executable by a processor to determine one or more intervals that correspond to a periodic signal that collides with portions of the TTI. The code may include instructions executable by a processor to communicate over the physical shared channel during the TTI, the TTI overlapping in time with the one or more intervals to allow communication of the periodic signal during the portions of the TTI.

Some examples of the method, apparatuses, and non-transitory computer-readable medium described herein may further include operations, features, means, or instructions for receiving the periodic signal during each of the one or more intervals that overlap in time with the TTI.

Some examples of the method, apparatuses, and non-transitory computer-readable medium described herein may further include operations, features, means, or instructions for transmitting the periodic signal during each of the one or more intervals that overlap in time with the TTI.

Some examples of the method, apparatuses, and non-transitory computer-readable medium described herein may further include operations, features, means, or instructions for determining a configuration of the periodic signal, where the one or more intervals may be identified based on the configuration.

Some examples of the method, apparatuses, and non-transitory computer-readable medium described herein may further include operations, features, means, or instructions for receiving, within the DCI, a modulation and coding scheme (MCS) table that indicates the configuration.

Some examples of the method, apparatuses, and non-transitory computer-readable medium described herein may further include operations, features, means, or instructions for receiving radio resource control (RRC) signaling that indicates the configuration.

Some examples of the method, apparatuses, and non-transitory computer-readable medium described herein may further include operations, features, means, or instructions for operating in a high-pathloss mode, where the TTI may be overlapped in time with the one or more intervals based on operation in the high-pathloss mode.

Some examples of the method, apparatuses, and non-transitory computer-readable medium described herein may further include operations, features, means, or instructions for determining a bit value within the DCI, where the TTI may be overlapped in time with the one or more intervals based on the determined bit value.

In some examples of the method, apparatuses, and non-transitory computer-readable medium described herein, communicating over the physical shared channel during the TTI may include operations, features, means, or instructions for transmitting a physical uplink shared channel (PUSCH) to another wireless device.

In some examples of the method, apparatuses, and non-transitory computer-readable medium described herein, communicating over the physical shared channel during the TTI may include operations, features, means, or instructions for transmitting a physical sidelink shared channel (PSSCH) to another wireless device.

In some examples of the method, apparatuses, and non-transitory computer-readable medium described herein, communicating over the physical shared channel during the TTI may include operations, features, means, or instructions for transmitting a physical downlink shared channel (PDSCH) to another wireless device.

In some examples of the method, apparatuses, and non-transitory computer-readable medium described herein, communicating over the physical shared channel during the TTI may include operations, features, means, or instructions for receiving a PDSCH from another wireless device.

In some examples of the method, apparatuses, and non-transitory computer-readable medium described herein, communicating over the physical shared channel during the TTI may include operations, features, means, or instructions for receiving a PSSCH from another wireless device.

In some examples of the method, apparatuses, and non-transitory computer-readable medium described herein, communicating over the physical shared channel during the TTI may include operations, features, means, or instructions for receiving a PUSCH from another wireless device.

In some examples of the method, apparatuses, and non-transitory computer-readable medium described herein, each of the one or more intervals includes a time duration for communicating the periodic signal and a timing gap before and after the time duration.

In some examples of the method, apparatuses, and non-transitory computer-readable medium described herein, the periodic signal includes a synchronization signal block (SSB), or a tracking reference signal (TRS), or a channel state information reference signal (CSI-RS), or a sounding reference signal (SRS), or a combination thereof.

In some examples of the method, apparatuses, and non-transitory computer-readable medium described herein, the device in the wireless network includes a node in an integrated access and backhaul (IAB) network.

A method of wireless communications at a device in a wireless network is described. The method may include transmitting a PDCCH including DCI that schedules a TTI for a physical shared channel. The method may include determining one or more intervals that correspond to a periodic signal that collides with portions of the TTI. The method may include communicating over the physical shared channel during the TTI, the TTI overlapping in time with the one or more intervals to allow communication of the periodic signal during the portions of the TTI.

An apparatus for wireless communications at a device in a wireless network is described. The apparatus may include a processor and memory coupled to the processor. The processor and memory may be configured to transmit a PDCCH including DCI that schedules a TTI for a physical shared channel. The processor and memory may be configured to determine one or more intervals that correspond to a periodic signal that collides with portions of the TTI. The processor and memory may be configured to communicate over the physical shared channel during the TTI, the TTI overlapping in time with the one or more intervals to allow communication of the periodic signal during the portions of the TTI.

Another apparatus for wireless communications at a device in a wireless network is described. The apparatus may include means for transmitting a PDCCH including DCI that schedules a TTI for a physical shared channel. The apparatus may include means for determining one or more intervals that correspond to a periodic signal that collides with portions of the TTI. The apparatus may include means for communicating over the physical shared channel during the TTI, the TTI overlapping in time with the one or more intervals to allow communication of the periodic signal during the portions of the TTI.

A non-transitory computer-readable medium storing code for wireless communications at a device in a wireless network is described. The code may include instructions executable by a processor to transmit a PDCCH including DCI that schedules a TTI for a physical shared channel. The code may include instructions executable by a processor to determine one or more intervals that correspond to a periodic signal that collides with portions of the TTI. The code may include instructions executable by a processor to communicate over the physical shared channel during the TTI, the TTI overlapping in time with the one or more intervals to allow communication of the periodic signal during the portions of the TTI.

Some examples of the method, apparatuses, and non-transitory computer-readable medium described herein may further include operations, features, means, or instructions for transmitting, to one or more other wireless devices, the periodic signal during each of the one or more intervals that overlap in time with the TTI.

Some examples of the method, apparatuses, and non-transitory computer-readable medium described herein may further include operations, features, means, or instructions for receiving, from another wireless device, the periodic signal during each of the one or more intervals that overlap in time with the TTI.

Some examples of the method, apparatuses, and non-transitory computer-readable medium described herein may further include operations, features, means, or instructions for determining a configuration of the periodic signal, where the one or more intervals may be identified based on the configuration of the periodic signal.

Some examples of the method, apparatuses, and non-transitory computer-readable medium described herein may further include operations, features, means, or instructions for generating an MCS table that indicates the configuration of the periodic signal, and transmitting the MCS table within the DCI.

Some examples of the method, apparatuses, and non-transitory computer-readable medium described herein may further include operations, features, means, or instructions for transmitting RRC signaling that indicates the configuration of the periodic signal.

Some examples of the method, apparatuses, and non-transitory computer-readable medium described herein may further include operations, features, means, or instructions for operating in a high-pathloss mode, where the TTI may be overlapped in time with the one or more intervals based on operation in the high-pathloss mode.

Some examples of the method, apparatuses, and non-transitory computer-readable medium described herein may further include operations, features, means, or instructions for configuring, within the DCI, a bit value that indicates whether the TTI may be overlapped in time with the one or more intervals.

In some examples of the method, apparatuses, and non-transitory computer-readable medium described herein, communicating over the physical shared channel during the TTI may include operations, features, means, or instructions for receiving a PUSCH from another wireless device.

In some examples of the method, apparatuses, and non-transitory computer-readable medium described herein, communicating over the physical shared channel during the TTI may include operations, features, means, or instructions for receiving a PSSCH from another wireless device.

In some examples of the method, apparatuses, and non-transitory computer-readable medium described herein, communicating over the physical shared channel during the TTI may include operations, features, means, or instructions for receiving a PDSCH from another wireless device.

In some examples of the method, apparatuses, and non-transitory computer-readable medium described herein, communicating over the physical shared channel during the TTI may include operations, features, means, or instructions for transmitting a PDSCH to another wireless device.

In some examples of the method, apparatuses, and non-transitory computer-readable medium described herein, communicating over the physical shared channel during the TTI may include operations, features, means, or instructions for transmitting a PSSCH to another wireless device.

In some examples of the method, apparatuses, and non-transitory computer-readable medium described herein, communicating over the physical shared channel during the TTI may include operations, features, means, or instructions for transmitting a PUSCH to another wireless device.

In some examples of the method, apparatuses, and non-transitory computer-readable medium described herein, each of the one or more intervals includes a time duration for communicating the periodic signal and a timing gap before and after the time duration.

In some examples of the method, apparatuses, and non-transitory computer-readable medium described herein, the device in the wireless network includes a node in an IAB network.

DETAILED DESCRIPTION

Figure 1:
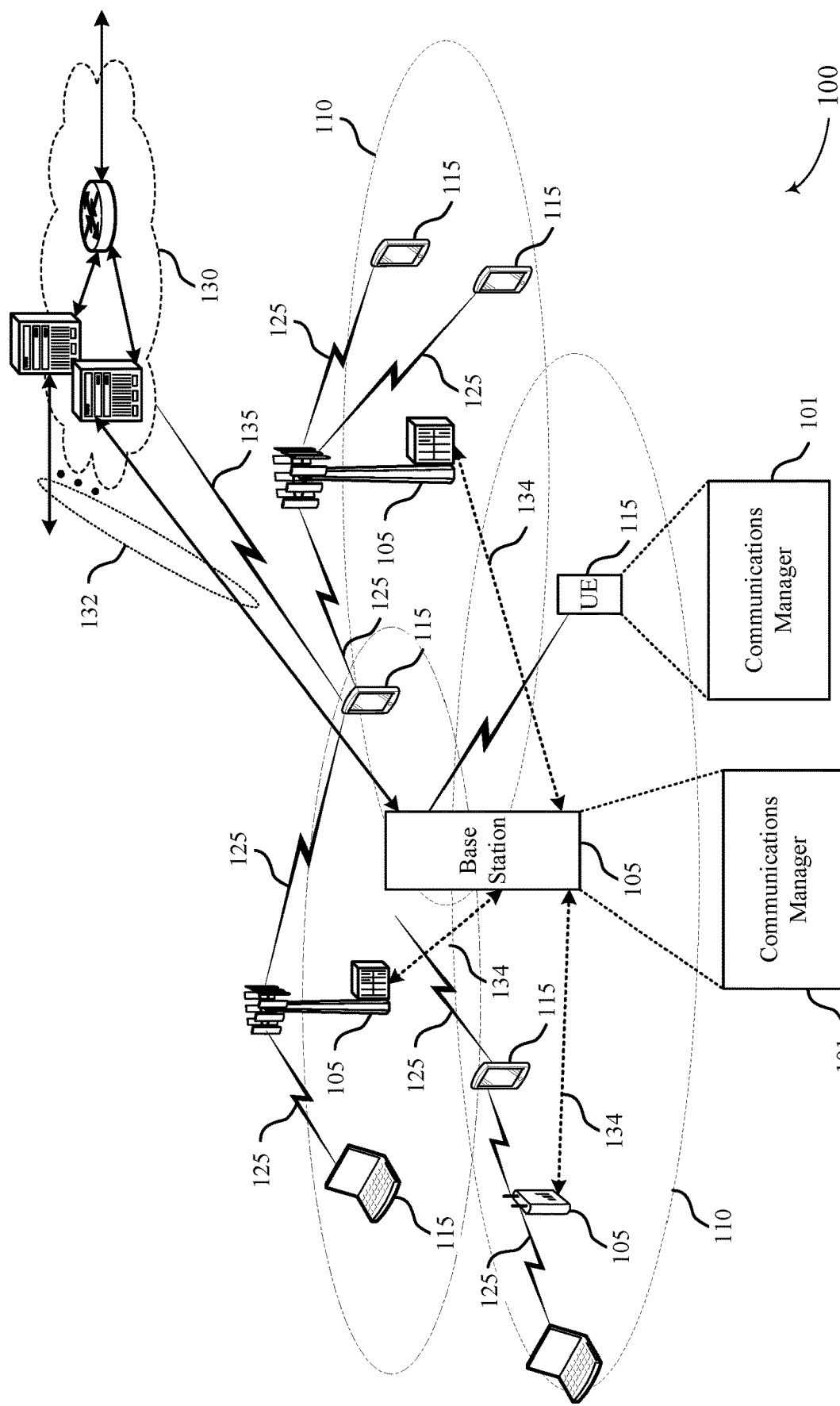
FIG. 1 illustrates an example of a wireless communications system that supports beam management for high-pathloss mode operations in accordance with one or more aspects of the present disclosure.

Some wireless communications systems may include access nodes to facilitate wireless communications between a UE and a network. Such deployments may use beamformed transmissions in mmW frequency ranges for communications between different nodes, which may include access and/or backhaul communications. For instance, a parent node (which may also be referred to as a donor node, an anchor node, or other like terminology) may have a high-capacity, wired, backhaul connection (e.g., fiber) to the core network. The parent node may also communicate (e.g., using directional beams) with one or more other nodes (e.g., relay nodes or devices) and/or UEs that may be referred to as child nodes. As such, wireless communications between the parent node and other devices may include backhaul communications, access communications, or a combination thereof. Such systems may be referred to as an IAB network.

Wireless communication systems such as an IAB network may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Due to the increased amount of pathloss in mmW communication systems, transmissions from the base station and/or the UE may be beamformed. Moreover, a receiving device may use beamforming techniques to configure antenna(s) and/or antenna array(s) such that transmissions are received in a directional manner. In some cases, the pathloss over a channel may become excessive (e.g., 20 to 30 dB higher than a pre-defined threshold) and a high-pathloss mode may be enabled such that the duration of transmissions (e.g., on control and data channels) is increased. For instance, the high-pathloss mode may utilize relatively longer TTIs for certain channels, such as a PUSCH and PDSCH, to attempt to overcome the pathloss (e.g., increased pathloss) experienced on the channel. In some cases, the TTIs of a PDSCH or a PUSCH may have a duration on the order of multiple TTIs (e.g., multiple slots or 10 ms). This duration may be determined based on a balance between a PDCCH occupying the length of a slot while keeping the overhead of PDCCH from becoming too high.

In some cases, channels may change while operating in high-pathloss mode due to interference or adverse environmental or weather conditions (e.g., fog rain, wind, etc.) which may cause angle of arrival (AoA) spread. Likewise, objects such as animals, trees, and vehicles may cause blocking. Because of the longer duration transmissions, beam management related signaling may be put on hold while a physical shared channel (e.g., PDSCH, PUSCH) is transmitted under the high-pathloss mode, and the efficiency of beam management may thus be impaired.

However, in one or more aspects of the techniques described herein, to maintain beam management efficiency, signaling related to beam management and reporting (such as CSI-RSs, TRSs, SRSs, and the like) may be transmitted at regular intervals during the TTI of a physical shared channel. In some cases, a bit in a scheduling DCI may be set that indicates whether the TTI (e.g., the TTI used to transmit or receive PUSCH, PDSCH, or PSSCH, in a high-pathloss mode) may be interrupted for repeated transmission of CSI-RS, SRS, TRS, preconfigured CSI-RS/SS resource sets, and/or beam reports. The regular and scheduled interruption of the increased physical shared channels may maintain beam management efficiency in adverse network conditions. As such, a system implementing the described techniques may be associated with more accurate transmission and/or reception beams during poor network conditions compared to a system implementing alternative methods, which may result in a greater likelihood for successful communications within the system. Accordingly, the system may reduce interference and support a higher achievable throughput. Further, based on periodically interrupting the TTI used to transmit or receive communications over various channels, such as PUSCH, PDSCH, or PSSCH, the system may reduce latency associated with transmitting beam management signals and/or latency associated with successfully receiving a message.

Aspects of the disclosure are initially described in the context of a wireless communications system. Specific examples are the described for beam management for high-pathloss mode operations in an IAB communications network. Aspects of the disclosure are further illustrated by and described with reference to apparatus diagrams, system diagrams, and flowcharts that relate to beam management for high-pathloss mode operations.

FIG. 1 illustrates an example of a wireless communications system 100 that supports beam management for high-pathloss mode operations in accordance with one or more aspects of the present disclosure. The wireless communications system 100 includes base stations 105 (e.g., gNodeBs (gNBs) and/or radio heads (RHs)), UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 (e.g., eNodeBs (eNBs, network access devices, gNBs) 105-a, gNBs, or access node controllers (ANCs)) may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). In some cases, a UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, sometimes in the range of 300 megahertz (MHz) to 300 GHz. The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals (RSs), beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (e.g., the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100, which may operate in mmW radio frequency spectrum, may include access nodes to facilitate wireless communication between a UE 115 and the network. In some cases, an anchor access node may be referred to as a parent node and may have a high-capacity, wired (e.g., fiber), backhaul connection to the core network 130, while communicating simultaneously with one or more access nodes (e.g., relay devices) or UEs 115 which may be referred to as child nodes. In some examples, an anchor access node may be referred to as an IAB donor node.

Thus, wireless communications system 100 may be an example of an IAB network, including a number of base stations 105 or network access nodes, each simultaneously supporting communication for multiple communication devices, such as UEs 115. Communications between the base station 105 and the UEs 115 may occur over a wireless channel (e.g., a radio frequency spectrum band) between the transmitting device and the receiving device. Due to a variety of conditions, the channel (or path) between the communicating devices may experience interference, blockage, etc., such that the wireless communications may fail. For example, techniques may be used to adjust various parameters used to perform the wireless communications over the channel (or path) to adapt to the channel conditions. However, such techniques may only be suitable when the pathloss (e.g., the interference, blockage, etc.) between the communicating devices is within a given range. Some deployment scenarios may experience excessive pathloss, such as in a mmW network, that exceeds the ability of some techniques to accommodate larger variations in pathloss. In some cases, wireless communications system 100 may support a high-pathloss mode, which may be enabled to support wireless communications when the pathloss value between the communicating devices satisfies or otherwise exceeds a threshold pathloss value. However, the transmission duration in the high-pathloss mode may be significantly increased (e.g., as compared to transmission durations in a non-high-pathloss mode). In some cases, the increased duration may cause beam management related signaling to be suspended during a data transmission, which may impair the efficiency of beam management that relies on such signaling.

One or more nodes in wireless communications system 100 may be operating under a high-pathloss mode in which the transmission duration of signals, control channels, and data channels is longer than when operating in modes for less adverse conditions. In this case, the transmissions of beam reports may be enabled to occur on regular intervals during TTI transmissions to maintain beam management efficiency. In some cases, a parent node may transmit a downlink channel that may schedule one or more uplink or downlink channels for a child node or UE 115. In such cases, the scheduled uplink and/or downlink transmissions may be interrupted by references signals or beams reports, or a combination thereof, that may be transmitted or received by the child node or UE 115.

One or more of the base stations 105 may include a communications manager 101, which may transmit a PDCCH including DCI that schedules a TTI for a physical shared channel, determine (e.g., identify) one or more intervals that correspond to a periodic signal that collides with portions (e.g., respective portions) of the TTI, and communicate over the physical shared channel during the TTI, the TTI overlapping in time with the one or more intervals to allow communication of the periodic signal during the portions (e.g., the respective portions) of the TTI.

One or more of the UEs 115 may include a communications manager 101, which may receive a PDCCH including DCI that schedules a TTI for a physical shared channel, determine (e.g., identify) one or more intervals that correspond to a periodic signal that collides with portions (e.g., respective portions) of the TTI, and communicate over the physical shared channel during the TTI, the TTI overlapping in time with the one or more intervals to allow communication of the periodic signal during the portions (e.g., the respective portions) of the TTI.

Figure 2:
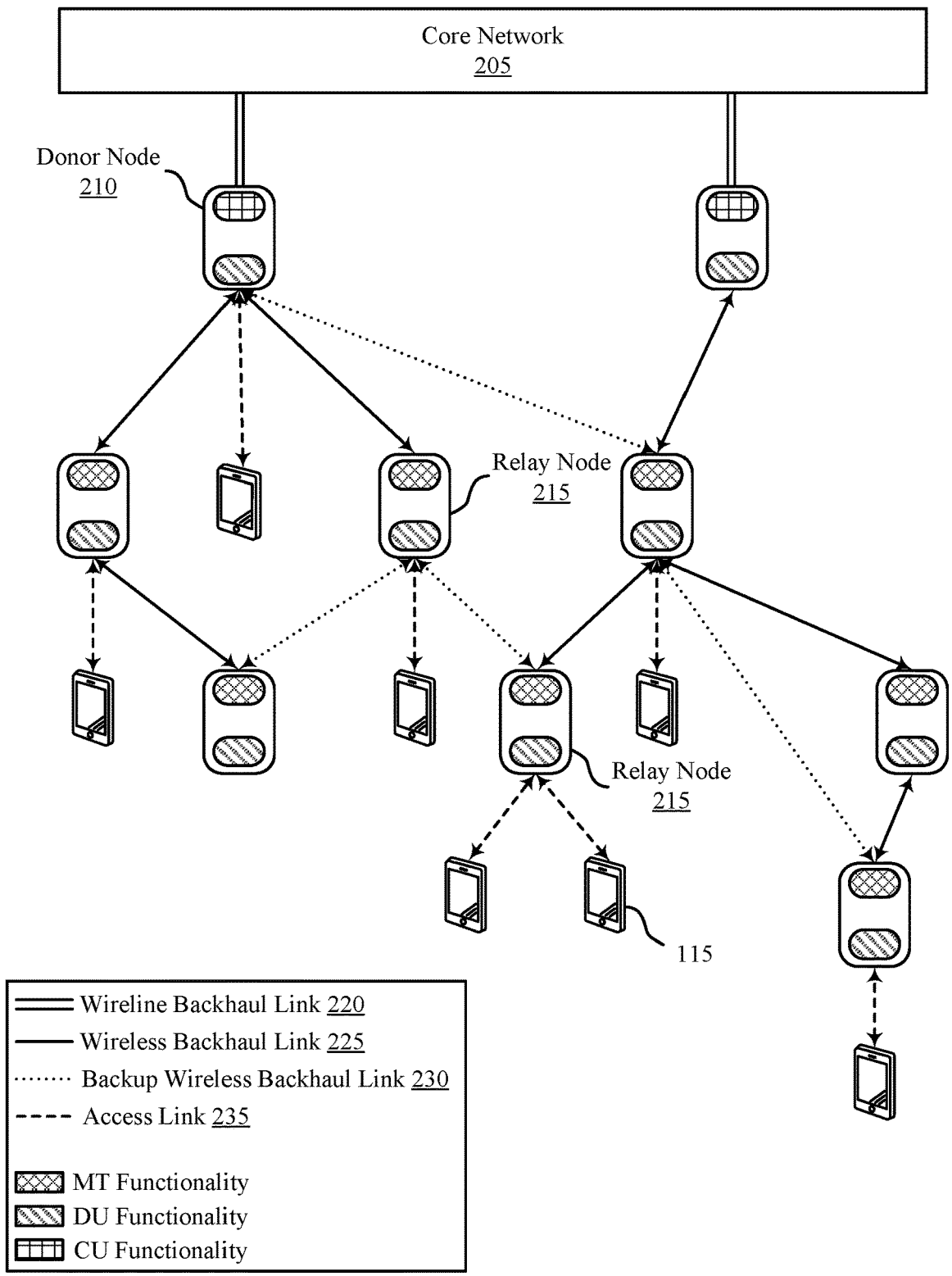
FIG. 2 illustrates an example of a wireless communications system that supports beam management for high-pathloss mode operations in accordance with one or more aspects of the present disclosure.

FIG. 2 illustrates an example of a wireless communications system 200 that supports beam management for high-pathloss mode operations in accordance with one or more aspects of the present disclosure. In some examples, wireless communications system 200 may implement aspects of wireless communications system 100. Wireless communications system 200 (e.g., an NR system, a mmW system, etc.) may supplement wireline backhaul connections (e.g., wireline backhaul links 220) by sharing infrastructure and spectral resources for network access with wireless backhaul link capabilities, which may provide an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235, etc.). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), PDCP, etc.) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) and/or layer 2 (L2) (e.g., RLC, MAC, physical (PHY) layer, etc.) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g., via a backhaul link, such as a primary wireless backhaul link 225 or a backup wireless backhaul link 230).

TAB relay nodes 215 may be split into associated mobile terminal (MT) and base station DU entities, where MT functionality of the IAB relay nodes 215 may be controlled and/or scheduled by antecedent (i.e., parent) IAB nodes via wireless backhaul links. A parent node to an IAB relay node 215 may be another (antecedent) IAB relay node 215 or an IAB donor node 210. The MT functionality may be similar to functionality performed by UEs 115 in the system. An IAB relay node 215 may not be directly connected to a wireline backhaul link 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU or the core network 205 either directly or via one or more IAB relay nodes 215. Each IAB relay node 215 may include a primary wireless backhaul link 225 for relaying data upstream and/or receiving information from a base station CU or the core network 205. In some cases, an IAB relay node 215 may additionally include one or more backup wireless backhaul links 230 (e.g., for redundant connectivity and/or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled and/or scheduled by a first parent node. The one or more secondary backhaul links (e.g., backup wireless backhaul links 230) may be associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB relay nodes 215 and UEs 115 within the IAB network (e.g., downstream in the IAB network) via the configured backhaul and access links. For example, an IAB relay node 215 may act as a relay between an IAB donor node 210 and one or more descendant devices (e.g., other IAB relay nodes 215, UEs 115, etc.) in both communication directions based on established backhaul and access connections.

In some cases, wireless networks such as an IAB network may rely on wireless transmissions propagated over a path between the wireless devices such as access link 235. The nature of the propagation path may vary due to mobility, interference, hidden nodes, blockage, and the like, such that wireless devices, such as IAB relay node 215 and UE 115, may overcome the pathloss to ensure continued wireless communications. Some wireless networks are configured to adjust various communication parameters in response to relatively minor changes in the propagation path. However, in some instances the pathloss value may exceed the ability of such techniques, which may result in a loss of communications between the wireless devices.

As one non-limiting example, mmW wireless networks may be considered an economically viable option (e.g., to provide backhaul services) as an alternative to wireline backhaul services, such as over fiberoptic networks. The wireless backhaul option may be helpful in developing countries with a lack of wireline infrastructure and/or in developed countries due to the high cost of deploying new wireline infrastructure.

However, backhaul services may have an associated high reliability requirement. This may mean that the reliability of wireless communications may be maintained during all weather conditions, propagation path variations, etc. However, the nature of mmW propagation is such that the pathloss may increase significantly (e.g., 30 dB or more in certain weather conditions, such as heavy rain). As one non-limiting example, mmW wireless backhaul link distances between 1-3.5 kilometers may be deployed, with the resulting pathloss values of 120 to 132 dB at 28 GHz due to such link distances. Heavy rain in this instance may add another 30 dB, 45 dB, or more (depending on link target reliability and distance), which may result in total pathloss in the 165 to 180 dB range. Some wireless techniques, however, are not configured to support such a high-pathloss. Accordingly, aspects of the described techniques provide a mechanism to maintain the link budget in a challenging pathloss environment by adopting a high-pathloss mode for the wireless devices.

It is to be understood that the described techniques may not be limited to a mmW network and/or to wireless backhaul communications. For example, aspects of the described techniques may be implemented by any wireless device (e.g., such as any base station 105 and/or UE 115) operating in a wireless network (e.g., a Wi-Fi network, an LTE/LTE-A network, a NR/5G network, and the like). The wireless device may implement the described techniques in any wireless network experiencing a high-pathloss value to ensure continued wireless communications over the network. The wireless device may implement the described techniques over a licensed radio frequency spectrum band and/or a shared or unlicensed radio frequency spectrum band.

In some examples, the UEs 115 or IAB donor nodes 210 or IAB relay nodes 215 may operate in at least two pathloss modes: a low (normal) pathloss mode (which may be referred to as a first pathloss mode) and the high-pathloss mode (which may be referred to as a second pathloss mode). Broadly, any of the wireless devices of wireless communications system 200 may use any combination of the two modes simultaneously to communicate with different nodes. The high-pathloss mode may include various parameters (alone or in any combination) that support continued wireless communications being performed over the radio frequency spectrum band experiencing a pathloss value that has satisfied (or exceeded) the threshold pathloss value. Examples of such parameters include, but are not limited to, an MCS, a HARQ, SSB, CSI-RS, demodulation reference signal (DMRS), an aggregation level, bandwidth, beam width (or beam selection), and the like. For example, the length of the SSB (e.g., the amount of time/frequency resources allocated to SSB transmissions) in the first pathloss mode may be shorter than the length of the SSB in the second pathloss mode.

Similar reasons that may warrant a first wireless device and a second wireless device to switch to a high-pathloss mode may also cause channel conditions to change. In these cases, beam management related signaling may occur to account for the changes in channel conditions. However, due to the increased duration of PUSCH and PDSCH TTIs in a high-pathloss mode, beam management efficiency may be impaired, where beam management signaling may be unavailable while a wireless device is transmitting or receiving data. However, beam reports and reference signals may be transmitted on regular intervals that overlap or interrupt the TTI for PUSCH and PDSCH transmission. For instance, multiple intervals may be used to allow gaps in a TTI that enable signaling to be transmitted for the purpose of beam management, reporting, and other similar operations. In some cases, a parent node may indicate, in a downlink channel to a child node, allocated resources for one or more downlink channels, uplink channels, or a combination thereof. The scheduling may indicate when a scheduled downlink or uplink channel may be paused for the reception or transmission of reference signals and other beam management related signaling during the uplink and downlink channels. In other cases, the child node may determine or identify a configuration of the relevant signaling, and may determine where respective intervals may interrupt a TTI carrying an uplink or downlink channel.

Figure 3:
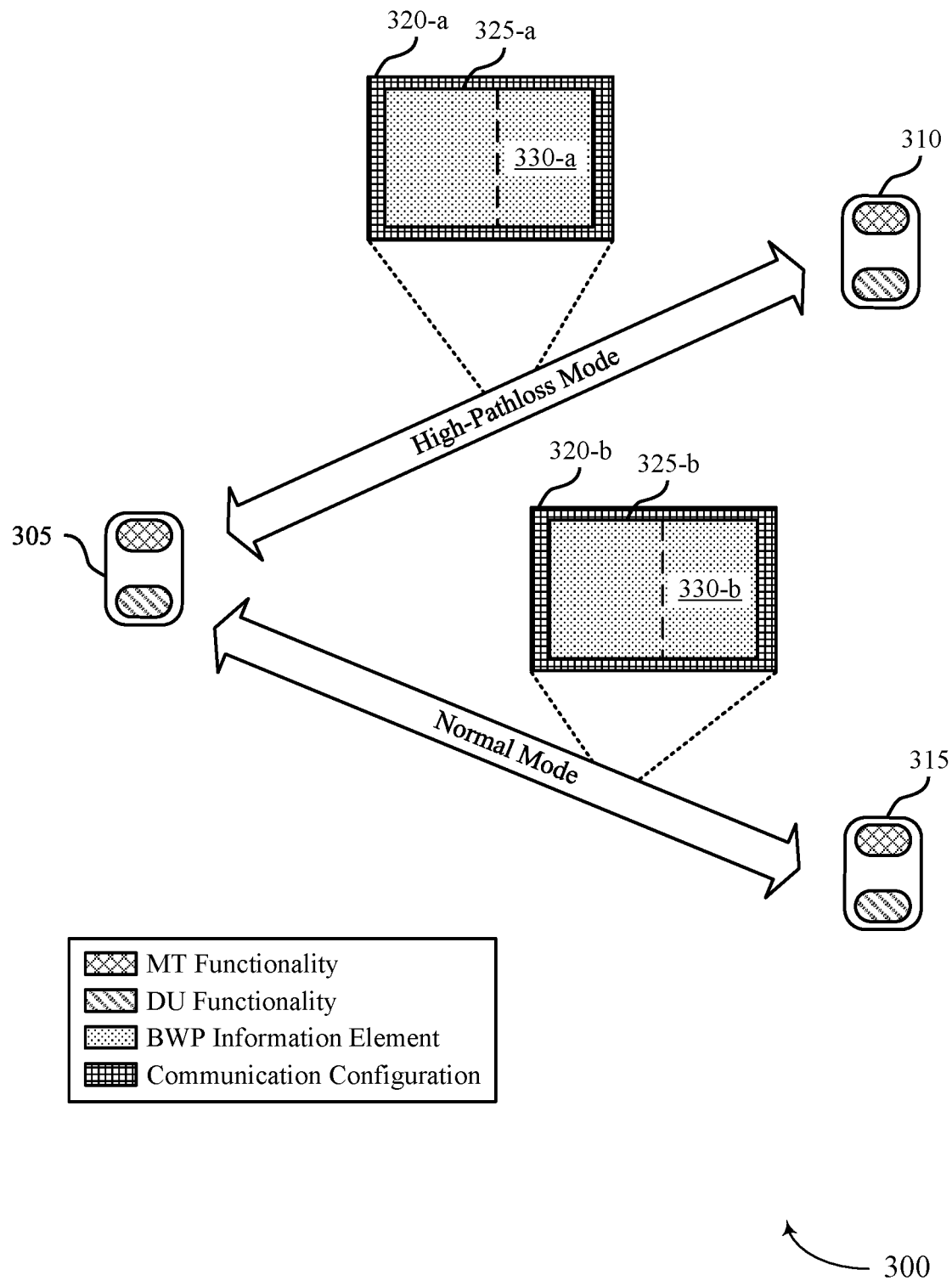
FIG. 3 illustrates an example of a wireless communications system that supports beam management for high-pathloss mode operations in accordance with one or more aspects of the present disclosure.

FIG. 3 illustrates an example of a wireless communications system 300 that supports beam management for high-pathloss mode operations in accordance with one or more aspects of the present disclosure. In some examples, wireless communications system 300 may implement aspects of the wireless communications system 100 or the wireless communications system 200. In some aspects, wireless communications system 300 may operate within an IAB network. For example, IAB nodes 305, 310, and 315 may be nodes within a larger IAB network, and IAB node 305 may communicate with IAB node 310 or IAB node 315 over wireless or wired backhaul links. IAB nodes 305, 310, and 315 may be examples of wireless devices, relay nodes, donor nodes, or IAB nodes as described herein.

In some cases, wireless devices (e.g., IAB nodes 305, 310, or 315) may operate in one of more pathloss modes such as a high-pathloss mode when the pathloss value satisfies (or exceeds) a threshold pathloss value or a normal (e.g., low) pathloss mode when the pathloss value is below the threshold pathloss value. For instance, one or more wireless devices may perform wireless communications in the wireless communications system 300 over a radio frequency spectrum band. In some aspects, this may include the wireless device(s) operating in a first pathloss mode (e.g., a low pathloss mode or normal mode) in the wireless communications system 300. The wireless device(s) may receive a signal that indicates that the pathloss value has satisfied (or exceeded) a threshold pathloss value. In some examples, the wireless device(s) may monitor a channel of the radio frequency spectrum band (e.g., monitor signals being communicated over the channel) and determine that the pathloss value has satisfied (or exceeded) the threshold pathloss value. In some other examples, the wireless device(s) may receive a signal from another wireless device indicating that the pathloss value has satisfied (or exceeded) the threshold pathloss value. Accordingly, the wireless device(s) may switch from the first pathloss mode (e.g., a low pathloss mode) to a second pathloss mode (e.g., high-pathloss mode) and continue to perform wireless communications. The second pathloss mode (e.g., the high-pathloss mode) may include one or more parameters to support continued wireless communications in the high-pathloss environment. Examples of the parameters that may be adjusted may include, but are not limited to, the length of the SSB in the high-pathloss mode being longer, the length of a reference signal in the high-pathloss mode being longer, an MCS in the high-pathloss mode being lower, and the like. Accordingly, the wireless devices may continue to perform wireless communications in the wireless communications system 300 in the high-pathloss environment according to the second pathloss mode (e.g., the high-pathloss mode).

Aspects of the described techniques enable support for wireless communications over a radio frequency spectrum band in a high-pathloss environment by utilizing a high-pathloss mode. The high-pathloss mode may utilize various parameters (e.g., MCS, HARQ, aggregation level, reference signals, etc.) that are configured or otherwise selected to support wireless communications over the radio frequency spectrum band experiencing a pathloss that satisfies (or exceeds) a threshold pathloss value.

As shown, IAB node 305 may communicate with IAB node 310 in a high-pathloss mode (e.g., if the high-pathloss mode is activated at IAB node 305 for these communications) and may communicate with IAB node 315 in a normal mode (e.g., if the high-pathloss mode is deactivated at IAB node 305 for these other communications). An indication of which mode to use for communication may be transmitted from IAB node 305 to one or both of IAB nodes 310 and 315. For example, IAB node 305 may transmit a communication configuration 320-a to IAB node 310 to communicate in high-pathloss mode. The communication configuration 320-a may instruct IAB node 310 to operate in the high-pathloss mode for communications with IAB node 305. The communication configuration 320-a may also include a bandwidth part (BWP) information element 325-a that indicates BWP parameters for the BWP used for communication between IAB node 305 and IAB node 310. In some example, the communication configuration 320-a may include one or more additional bits 330-a, which may indicate that the BWP identified by BWP information element 325-a is configured for high-pathloss communications. As shown, the one or more additional bits 330-a may be a part of the BWP information element 325-a.

For normal mode operations, IAB node 305 may transmit a communication configuration 320-b to IAB node 315. The communication configuration 320-b may include a BWP information element 325-b, and one or more additional bits 330-b, which may be a part of the BWP information elements 325. The one or more additional bits 330-b may indicate that the BWP identified by BWP information element 325-b is configured for normal mode communications. Based on the communication configuration(s) 320, the DU and/or MT functionality of an IAB node 305, 310, or 315 may be configured with different downlink or uplink BWPs for high-pathloss mode and normal mode that are activated based on the communication configuration(s) 320 sent to the respective IAB node 310 or 315. For example, IAB node 310 may perform communications using the high-pathloss BWP identified by BWP information element 325-a upon reception (or after a duration following reception) of communication configuration 320-a.

In some cases, IAB node 305 may enter a high-pathloss mode and may communicate with IAB node 310 after a given time interval. For example, the communication configuration 320-a may include timing information (e.g., an indication of a time interval that IAB node 310 is to wait before operating in high-pathloss mode), and IAB node 305 may instruct IAB node 310 to activate a high-pathloss BWP based on this timing information. In some cases, the BWP information element 325-a may include additional information (e.g., via the one or more additional bits 330-a) which indicates that the BWP has been configured for the high-pathloss mode, which signals to the MT of IAB node 310 to fully enter the high-pathloss mode after a specific time and no additional signaling may be used for entering or exiting high-pathloss mode.

In some aspects, configuration parameters of the communication configuration 320 may be configured differently between pathloss modes (e.g., a first subset of configuration parameters may be variable between high-pathloss mode and normal mode, while a second subset of configuration parameters may be configured to be the same between high-pathloss mode and normal mode). For example, control resource set (CORESET) parameters, channel state information (CSI) resources, and SRS resources may be different between high-pathloss mode and normal mode. Further, if the one or more additional bits 330 correspond to a high-pathloss mode (such as the one or more additional bits 330-a), a longer time duration for TTIs may be implemented for communications in the high-pathloss mode as compared to the time duration associated with TTIs for normal mode. Additionally, or alternatively, rules specific to the high-pathloss mode may be invoked (e.g., rules relating to procedures for interrupting data channels, such as a shared data channel, with a reference signal (RS), such as a TRS).

In some cases, other parameters (e.g., a second subset of configuration parameters) may be configured to be the same between high-pathloss and normal mode operations. For example, processing time related control parameters (e.g., latency parameters related to scheduling, parameters related to control operations) may remain the same for normal and high-pathloss modes.

When operating in a high-pathloss mode, nodes in the network may transmit or receive DCI that schedules a TTI for a physical shared channel (such as a PUSCH or a PDSCH). A wireless device may determine or identify one or more intervals that correspond to a periodic signal that collides with respective portions of the TTI and communicate over the physical shared channel during the TTI. In such cases, the TTI may overlap in time with the one or more intervals to allow communication of the periodic signal during the respective portions of the TTI.

Figure 4:
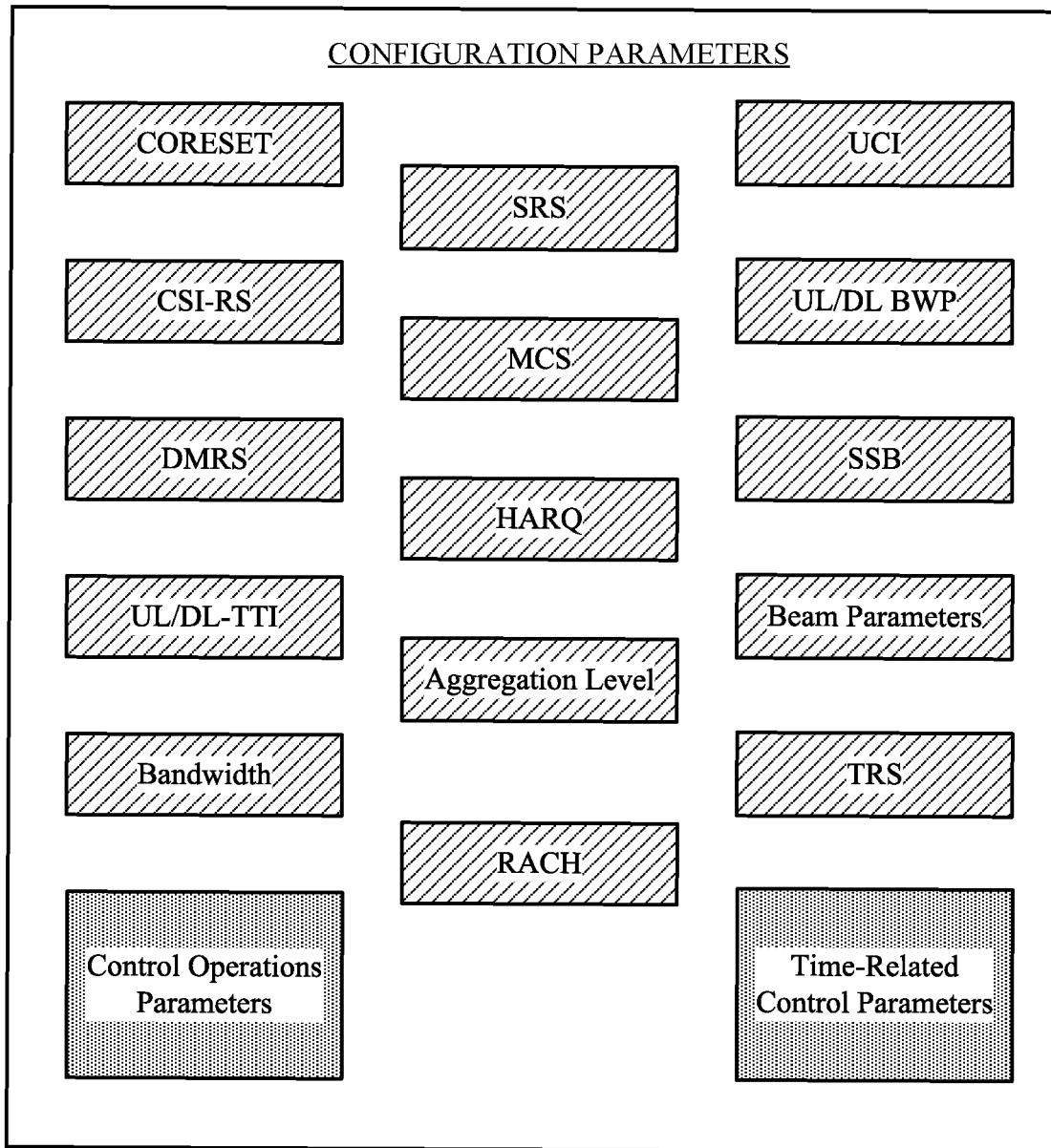
FIG. 4 illustrates example configuration parameters that support beam management for high-pathloss mode operations in accordance with one or more aspects of the present disclosure.

FIG. 4 illustrates example configuration parameters 400 that support beam management for high-pathloss mode operations in accordance with one or more aspects of the present disclosure. Configuration parameters 400 may include a set of configuration parameters for configuring communications according to different pathloss modes.

In some examples, one or more configuration parameters 400 may be configured to support high-pathloss mode communications (e.g., for devices operating in a high-pathloss mode, such as a parent IAB node communicating with a child IAB node using a high-pathloss communication link). Further, one or more configuration parameters 400 may be configured to support normal mode communications (e.g., for devices operating in a normal pathloss mode, such as a parent IAB node communicating with a child IAB node using a normal pathloss communication link).

In some cases, a subset of configuration parameters 400 may be configurable between pathloss modes. For example, one or more configuration parameters 400 may be variable or dynamic between pathloss modes, while other configuration parameters 400 may be static and remain the same between different pathloss modes. In one example, a subset of the configuration parameters 400 that may be different for high-pathloss mode operation compared to normal mode operation. Such parameters may include CORESET parameters (e.g., CORESET #0 information or common CORE- SET information), CSI-RS parameters (e.g., CSI-RS resource configuration, periodicity, or measurement information), and SRS parameters (e.g., SRS configuration or SRS resources). Other configurable parameters may include uplink control information (UCI) parameters (e.g., UCI resources), MCS parameters (e.g., modulation order and coding scheme), and uplink or downlink BWP parameters (e.g., control or data channel configuration parameters, frequency location, numerology, timing information, etc.). Such parameters may also include DMRS parameters (e.g., DMRS resources or mapping type), HARQ parameters (e.g., HARQ feedback information, such as #HARQ N1, MCS, etc.), SSB parameters (SSB position, periodicity, and/or power), uplink or downlink TTI information (e.g., uplink TTI duration and location or downlink TTI duration and location), aggregation level parameters, beam parameters (e.g., beam width or index), bandwidth parameters (e.g., cell RS ports, frequency information, etc.), TRS parameters (e.g., rules for interrupting PUSCH), and random access channel (RACH) parameters (e.g., RACH timing and resources), among others may also be configurable between different pathloss modes.

For example, one or more MCS parameters of the configuration parameters 400 may be configurable between pathloss modes. An MCS parameter may be associated with or include an MCS table with a number of entries (e.g., 16 entries). An entry may correspond to a coding rate or modulation order (e.g., quadrature phase shift keying (QPSK), quadrature amplitude modulation (QAM) formats such as QAM16, QAM 64, and the like). In some examples, the MCS table may be configurable based on a pathloss mode. For example, the MCS table used for a normal pathloss operation mode may be different than the MCS table used for a high-pathloss operation mode. In some examples, the MCS tables may be different (e.g., each MCS table may include different entries) based on channel conditions. For example, an MCS table may include different entries based on a pathloss dynamic range (e.g., whether the pathloss dynamic range is associated with a normal pathloss operation mode or a high-pathloss operation mode), a signal-to-interference-plus-noise ratio (SINR), or any other channel condition metrics.

In some examples, a wireless device (e.g., a base station 105 or a parent IAB node) may send a control transmission (e.g., a PDCCH transmission) to a receiving wireless device (e.g., a UE 115 or a child IAB node). The control transmission may schedule a shared channel transmission (e.g., a PDSCH transmission or a PUSCH transmission). The control transmission may also include DCI, which may indicate, to the receiving wireless device, one or more configuration parameters 400. For instance, the DCI may indicate the MCS parameter (e.g., an entry of the MCS table) to the receiving wireless device. The receiving wireless device may determine a coding rate and modulation order based on the indication in the DCI (e.g., the coding rate and modulation order associated with the indicated entry of the MCS table). The receiving wireless device may use the determined coding and modulation order to transmit or receive a scheduled shared channel transmission.

Other configuration parameters 400 may be configured similarly between high-pathloss and normal modes. For example, configuration parameters 400 such as time-related control parameters (e.g., processing time related parameters, latency parameters, switching time parameters, scheduling parameters, or any combination of these or similar control parameters) that may be configured the same for both high-pathloss and normal modes. Further, other control operation parameters such as timing for beam change (e.g., timing between beam change command and the change of the beam) may be configured the same for both high-pathloss and normal modes.

When operating in a high-pathloss mode, nodes in the network may transmit or receive DCI that schedules a TTI for a physical shared channel (such as a PUSCH or a PDSCH). A wireless device may determine or identify one or more intervals that correspond to a periodic signal that collides with respective portions of the TTI, and communicate over the physical shared channel during the TTI. In such cases, the TTI may overlap in time with the one or more intervals to allow communication of the periodic signal during the respective portions of the TTI.

Figure 5:
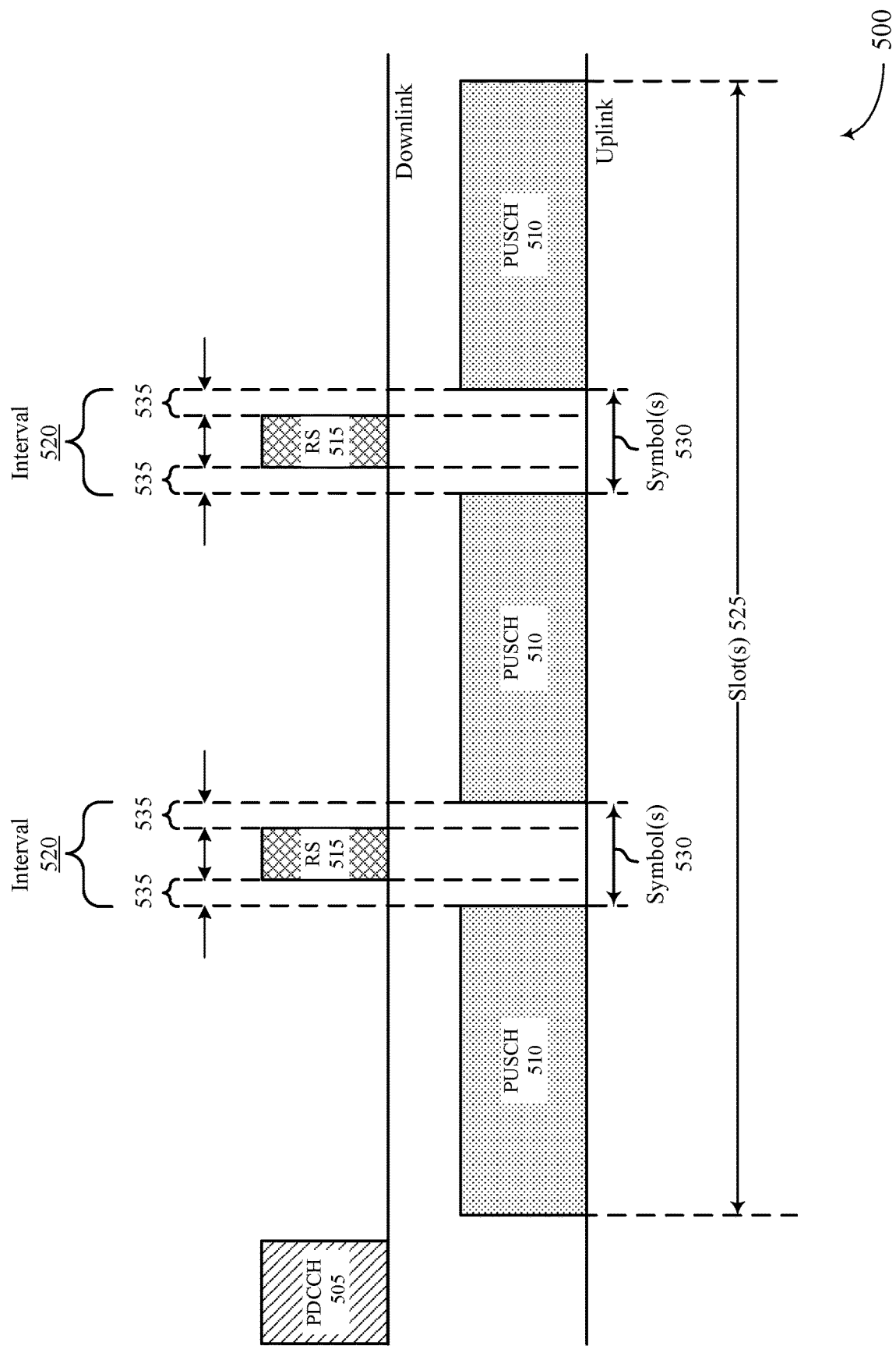
FIG. 5 illustrates an example of uplink and downlink signaling that supports beam management for high-pathloss mode operations in accordance with one or more aspects of the present disclosure.

FIG. 5 illustrates an example of uplink and downlink signaling 500 that supports beam management for high-pathloss mode operations in accordance with one or more aspects of the present disclosure. In some examples, uplink and downlink signaling 500 may implement aspects of wireless communications systems 100 and 200. For example, the uplink and downlink signaling 500 may illustrate uplink transmissions from a UE 115 to a base station 105, or may similarly represent uplink transmissions from a child node or UE 115 to a parent node. Likewise, the uplink and downlink signaling 500 may represent downlink signaling transmitted from a base station 105 or a parent node to a UE 115 or child node. The uplink and downlink signaling may support the use of intervals that interrupt or overlap PUSCH during a TTI and allow for the transmission of additional signaling.

In some cases, a network may operate under a high-pathloss mode such that nodes are transmitting and receiving data channels for longer durations than when non-adverse conditions are present. In some cases, and as described herein, some of the nodes in the network may operate under a lower pathloss mode (e.g., a first pathloss mode) and other nodes in the same network may operate under a high-pathloss mode (e.g., a second pathloss mode). When operating under the high-pathloss mode, a parent node may transmit a channel such as PDCCH 505 to one or more UEs 115, nodes, or a combination thereof. In some cases, the receiving nodes may be child nodes. DCI within PDCCH 505 may allocate resources and schedule uplink transmissions that will be transmitted by the child node, which may include uplink data transmissions over PUSCH 510. The PDCCH 505 may be transmitted during a TTI with a duration of one or more symbols and may be transmitted for a shorter duration than the PUSCH 510.

In some cases, PDCCH 505 may schedule one or multiple PUSCHs 510. The PDCCH 505 may also indicate to the child node that the PUSCH 510 may be interrupted, for example, so that the child node may receive downlink reference signals (e.g., CSI-RS, TRS, etc.), such as RSs 515 during an interval 520. A TRS may be used for time tracking, frequency tracking, path delay spread and doppler spread and a CSI-RS may be used for beam management. In some examples, the PDCCH 505 may also indicate when the interruption of the PUSCH 510 may occur and for how long (e.g., a duration of one or more intervals 520 that overlap the PUSCH 510). PUSCHs 510 may be transmitted during a TTI that includes one or more slots 525 (e.g., multiple slots 525) and the RSs 515 may be transmitted during one or more symbols 530 (e.g., OFDM symbol periods) that correspond to the interval 520. The PUSCH 510 utilized by nodes operating in a second pathloss mode (e.g., a high-pathloss mode) may be transmitted during a TTI that spans more slots 525 than if the channel is being utilized by a node in a first pathloss mode.

As a result of the intervals 520 that overlap the TTI during which PUSCH 510 is transmitted (e.g., the multiple symbols 530), in cases where a child node is configured with periodic RSs 515 that collide with a transmission of PUSCH 510, the PUSCH 510 may be interrupted for the RS 515. The intervals 520 may thus provide for the transmission of data in a high-pathloss mode while still enabling beam management and other functions that support communications efficiency. In some cases, there may also be a gap 535 between the PUSCH 510 and the RS 515 (e.g., on either or both sides of the RS 515). For example, the interval 520 may include gaps 535 that allow for the transition between uplink and downlink communications.

The RS 515 may be transmitted by the parent node to surrounding nodes, UEs 115, or a combination thereof. In some cases, the RS 515 may not be for the benefit of a particular receiving node and may be directed to child nodes that are not operating in a high-pathloss mode. The RSs 515 that are directed to nodes not operating in a high-pathloss node may be shorter (e.g., transmitted over a shorter duration) than the reference signals that are directed toward nodes operating in a high-pathloss mode.

Figure 6A:
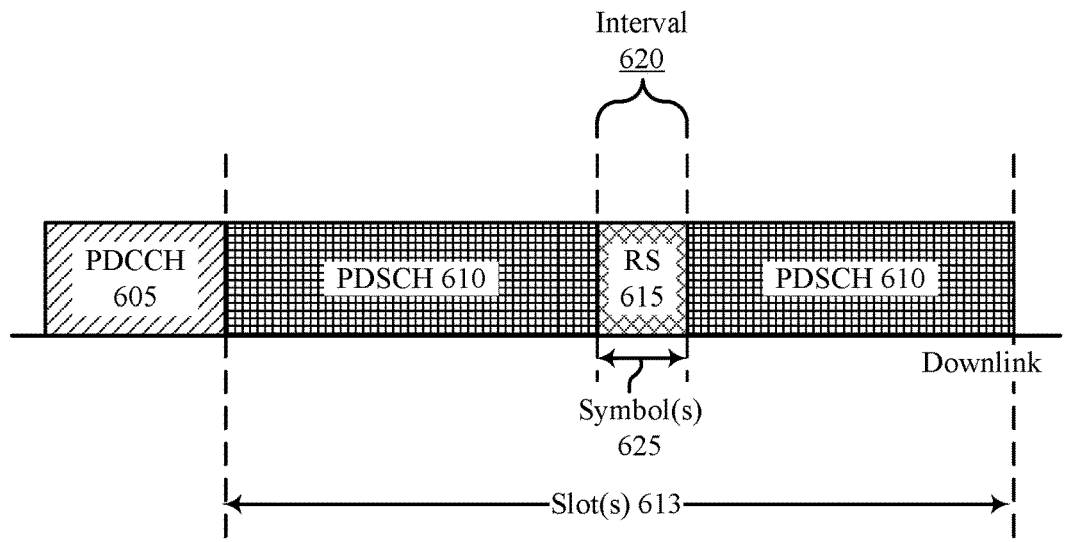
FIGS. 6A and 6B illustrate examples of uplink and downlink signaling that supports beam management for high-pathloss mode operations in accordance with one or more aspects of the present disclosure.

FIG. 6A illustrates an example of uplink and downlink signaling 601 that supports beam management for high-pathloss mode operations in accordance with one or more aspects of the present disclosure. In some examples, uplink and downlink signaling 601 may implement aspects of wireless communications system 100 and wireless communications system 200. For example, the uplink and downlink signaling 601 may illustrate uplink transmissions from a UE 115 to a base station 105, or may similarly represent uplink transmissions from a child node or UE 115 to a parent node. Likewise, the uplink and downlink signaling 601 may illustrate downlink signaling transmitted from a base station 105 or a parent node to a UE 115 or child node. The uplink and downlink signaling 601 may support the use of intervals that interrupt or overlap PDSCH during a TTI and allow for the transmission of additional uplink and/or downlink signaling.

In some cases, a network or part of a network may operate under a high-pathloss mode (e.g., a second pathloss mode) such that nodes are transmitting and receiving channels at longer durations than if the network is not operating in a high-pathloss mode (e.g., a first pathloss mode). A parent node may transmit a channel, such as PDCCH 605, to one or more UEs 115, nodes, or a combination thereof. In some cases, the receiving nodes may be child nodes. DCI within PDCCH 605 may allocate resources and schedule a downlink data transmission using a physical shared channel, such as PDSCH 610. The nodes operating in the second pathloss mode may use the PDSCH 610 and may transmit the PDSCH 610 during a TTI including multiple slots 613, which may be longer than a TTI used when operating under a first pathloss mode. The PDCCH 605 may schedule one or multiple PDSCHs 610.

The PDCCH 605 may also indicate to the child node that the PDSCH 610 may be interrupted so that the child node may receive one or more downlink RSs 615 (e.g., CSI-RS, TRS, etc.) from the parent node during an interval 620, where the interval 620 may span one or more symbols 625 (e.g., OFDM symbol periods) in time, allowing for the transmission of the RS 615. In some examples, the PDCCH 605 may indicate when the interruption of the PDSCH 610 is to occur and for how long (e.g., during one or more intervals 620 that overlap the PDSCH 610). In other examples, the child node may determine a configuration of the RS 615, and may identify that the RS 615 is transmitted periodically. In such cases, the child node may identify when the PDSCH 610 is to be interrupted by the RS 615 during one or more intervals 620. The RS 615 may be inserted within a PDSCH 610 (e.g., during interval 620) without gaps and may allow a node or UE 115 to train a receiving beam when conditions exist such that channel states may be changing.

Figure 6B:
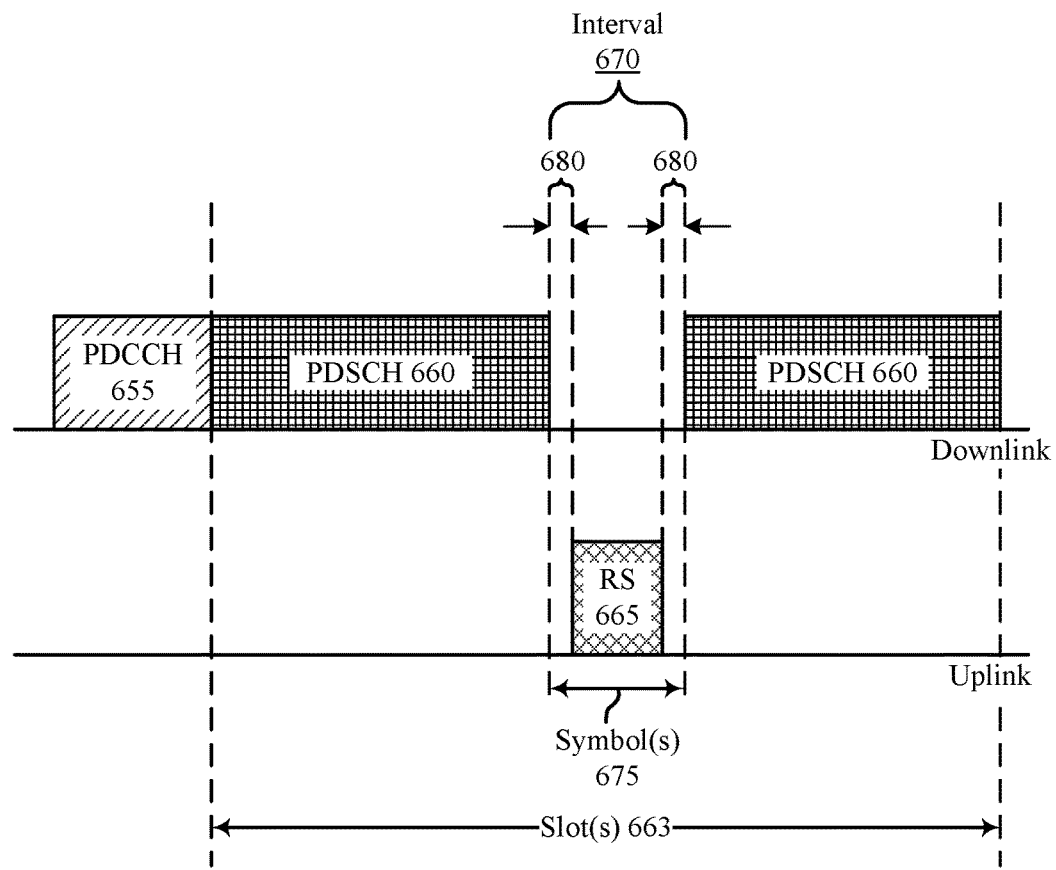

FIG. 6B illustrates an example of uplink and downlink signaling 602 that supports beam management for high-pathloss mode operations in accordance with one or more aspects of the present disclosure. In some examples, uplink and downlink signaling 602 may implement aspects of wireless communications system 100 and wireless communications system 200. For instance, the uplink and downlink signaling 602 may illustrate uplink transmissions from a UE 115 to a base station 105, or may similarly represent uplink transmissions from a child node or UE 115 to a parent node. Likewise, the uplink and downlink signaling 602 may illustrate downlink signaling transmitted from a base station 105 or a parent node to a UE 115 or child node. The uplink and downlink signaling 602 may support the use of intervals that interrupt or overlap PDSCH during a TTI and allow for the transmission of additional uplink and/or downlink signaling.

In some cases, a network may be operating under a high-pathloss mode (e.g., a second pathloss mode) such that nodes are transmitting and receiving channels at longer durations than normal. In some cases, some of the nodes in the network may be operating under a mode that may be used in non-adverse conditions (e.g., a first pathloss mode) and other nodes in the same network may be operating under a high-pathloss mode. A parent node may transmit a channel, such as PDCCH 655 to one or more UEs 115, nodes, or a combination thereof. In some cases, the receiving nodes may be child nodes. The PDCCH 655 may allocate resources and schedule a downlink transmission over PDSCH 660. The PDCCH 655 may schedule one or multiple PDSCHs 660. In some cases, nodes operating in a second pathloss made may use the PDSCH 660 and may transmit the PDSCH 660 during a TTI that includes multiple slots 663, which may be a TTI that is longer than a TTI used when the channel is transmitted by a node in a first pathloss mode.

The PDCCH 655 may also indicate to the child node that the PDSCH 660 may be interrupted so that the child node may transmit uplink RSs 665 (e.g., SRS), PUCCH, or a combination thereof. The RS 665 may be transmitted during an interval 670 that interrupts the TTI used to transmit the PDSCH 660. In cases where the RS 665 includes an SRS, the SRS may be used to estimate channel quality between nodes. As such, the interval 670 may allow for channel estimation to take place (at one or more nodes) while downlink data is being received by the child node. In some cases, the PDCCH 655 may indicate when an interruption of the PDSCH 660 is scheduled to occur (e.g., when intervals 670 may occur) and for how long. In some cases, the interval 670 may be long enough for the RS 665 to be transmitted over one or more symbols 675 corresponding to the interval 670, and may also include gaps 680 before and after the RS 630. As such, the gaps 680 may provide a time period to switch (e.g., to switch a transceiver) between uplink and downlink communications.

Figure 7:
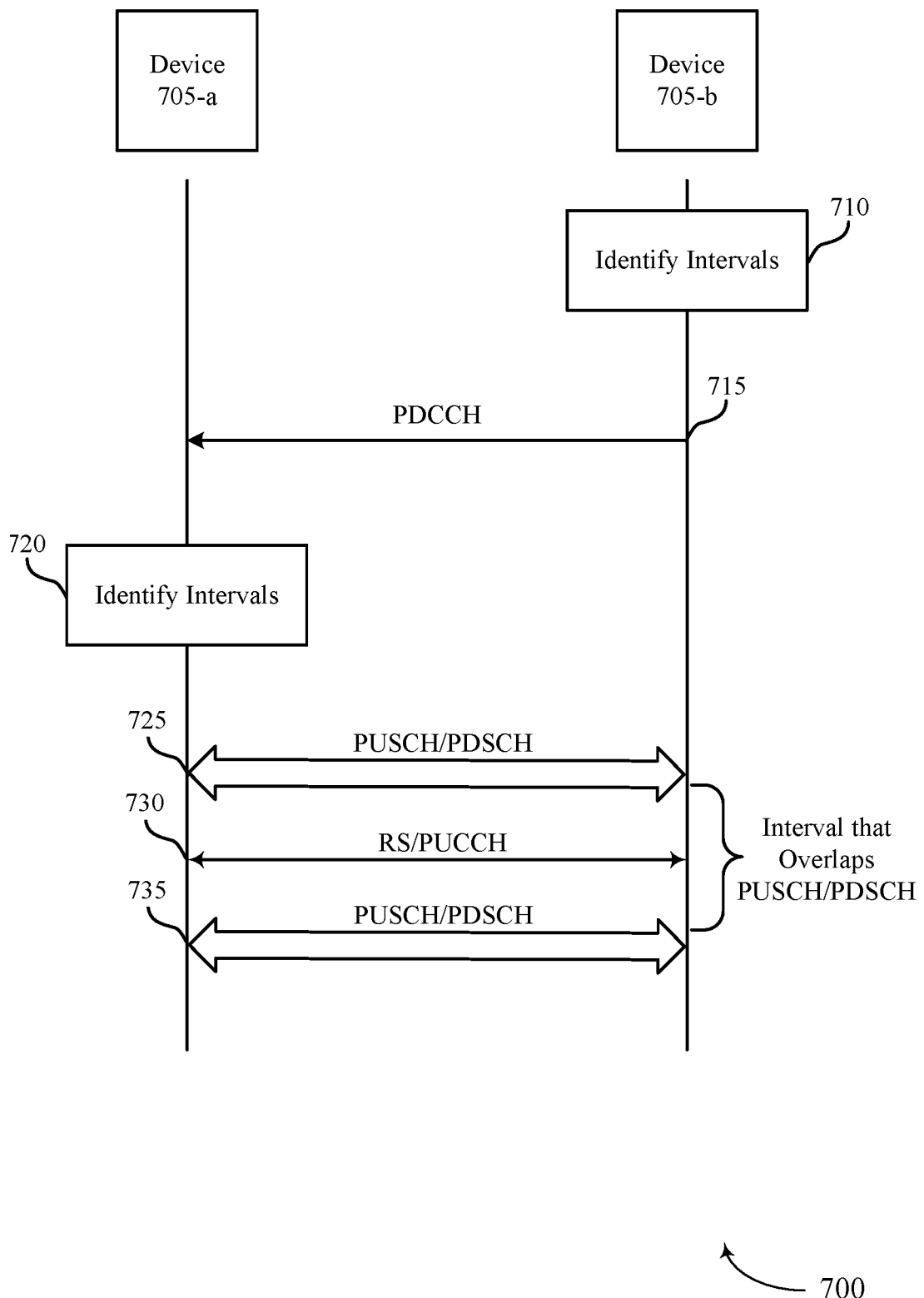
FIG. 7 illustrates an example of a process flow in a system that supports beam management for high-pathloss mode operations in accordance with one or more aspects of the present disclosure.

FIG. 7 illustrates an example of a process flow 700 in a system that supports beam management for high-pathloss mode operations in accordance with one or more aspects of the present disclosure. In some examples, process flow 700 may implement aspects of the wireless communications system 100 and the wireless communications system 200. For example, device 405-*a*, and 405-*b* may be examples of devices in an IAB network and may be examples of the corresponding wireless devices described with reference to FIGS. 1 and 2. Alternative examples of the following may be implemented, where some operations are performed in a different order than described or are not performed at all. In some cases, operations may include additional features not mentioned below, or further operations may be added.

At 710, device 705-*b* may identify intervals that correspond to a periodic signal that collides with respective portions of the TTI. Device 705-*b* may identify that a future TTI such as a PDCCH may be interrupted to enable beam management related signaling to continue throughout the high-pathloss mode. In some implementations, device 705-*b* may identify that device 705-*a* will receive a signal (e.g., TRS, CSI-RS, etc.) from device 705-*b* that may collide with a physical shared channel. Additionally or alternatively, device 705-*b* may identify that device 705-*a* may transmit a signal (e.g., SRS, PUCCH) to device 705-*b*.

At 715, device 705-*b* may transmit a PDCCH to device 705-*a*. The PDCCH may include DCI that may schedule a TTI for a physical shared channel (e.g., PDSCH or PUSCH). In some cases, the PDCCH may indicate to the device 705-*a* that the physical shared channel may be interrupted so that device 705-*a* may receive downlink reference signals (e.g., CSI-RS, TRS, etc.) or transmit uplink reference signals or channels (e.g., SRS, PUCCH). The PDCCH may also indicate when the interruption of the physical shared channel is to occur and for how long. At 720, device 705-*a* may identify intervals that correspond to a periodic signal that collides with respective portions of the TTI. The identification of periodic signals that may collide with portions of the TTI may be based on the information provided in the PDCCH. In other cases, the periodic signals may be identified by device 705-*a* based on a configuration of the periodic signals. As such, the intervals may be identified based on the configuration.

At 725, device 705-*a* and 705-*b* may communicate over the physical shared channel during the TTI. For example, downlink data may be transmitted from device 705-*b* to device 705-*a*. Alternatively, uplink data may be transmitted from device 705-*a* to device 705-*b*. At 730, the transmission of the physical shared channel during the TTI may be interrupted for the transmission and/or reception of signals (e.g., TRS, CSI-RS, SRS, or PUCCH). The TTI may overlap in time with the intervals to allow communication of the periodic signal during the respective portions. As an illustrative example, device 705-*a* may transmit a first SRS to device 705-*b* during the interval. Alternatively, device 705-*b* may transmit a CSI-RS at 730 during the interval. In any case, the signals sent at 730 may be transmitted while the PUSCH or PDSCH is being communicated. The length and type of the interruption at 730 may be known by device 705-*a* based on the PDCCH transmitted at 715 by device 705-*b*. At 735, devices 705-*a* and 705-*b* may continue to communicate over the physical shared channel during the transmission time interval. For example, the transmission of the PDSCH or the PUSCH may resume. In some cases, the transmission of the PDSCH or PUSCH may be interrupted by another interval, which may be based on the periodicity of signals transmitted or received during the interval that overlaps the TTI with PUSCH or PDSCH.

Figure 8:
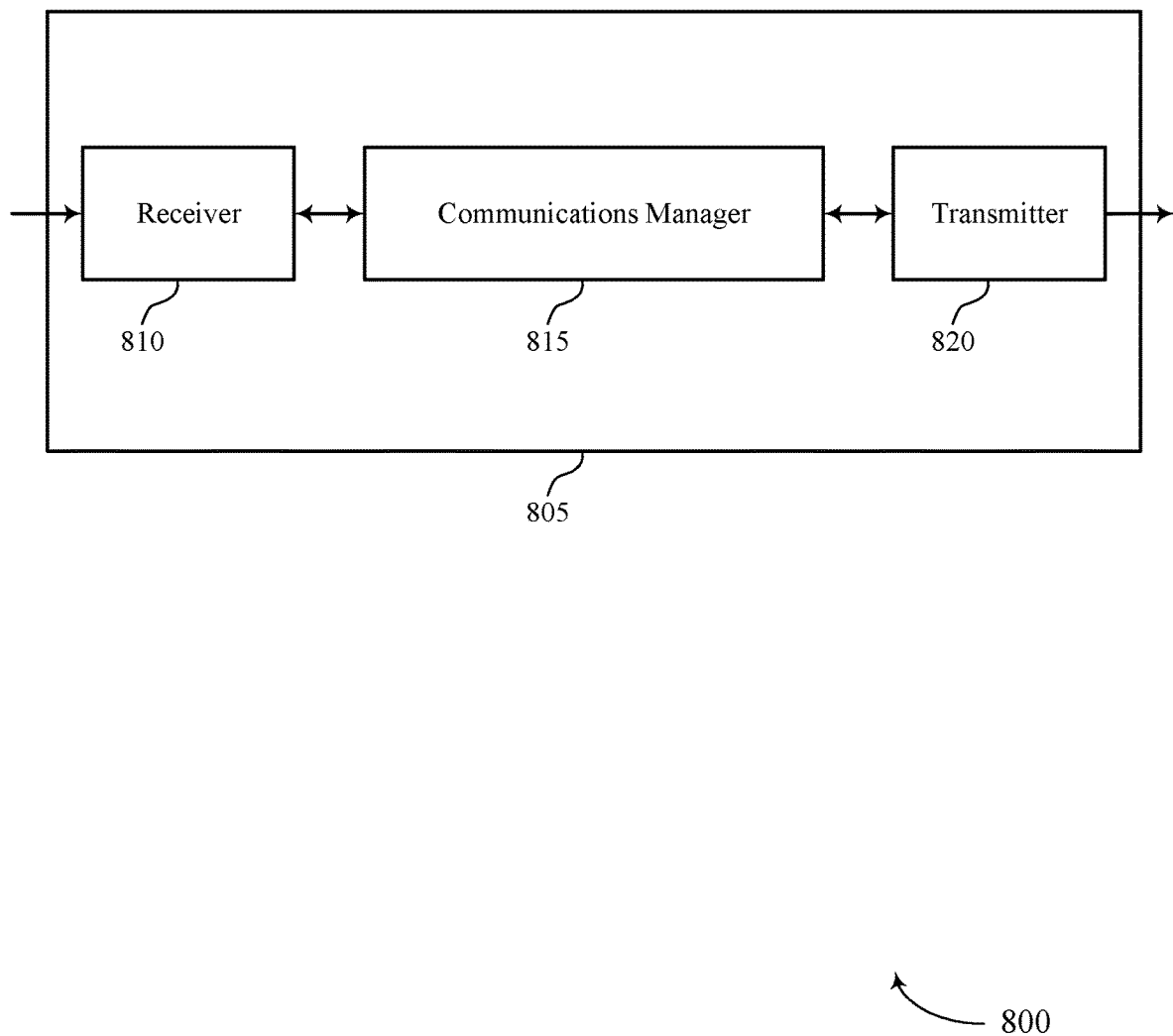
FIGS. 8 and 9 show block diagrams of devices that support beam management for high-pathloss mode operations in accordance with one or more aspects of the present disclosure.

FIG. 8 shows a block diagram 800 of a device 805 that supports beam management for high-pathloss mode operations in accordance with one or more aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to beam management for high-pathloss mode operations, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may receive a PDCCH including DCI that schedules a TTI for a physical shared channel, determine one or more intervals that correspond to a periodic signal that collides with portions of the TTI, and communicate over the physical shared channel during the TTI, the TTI overlapping in time with the one or more intervals to allow communication of the periodic signal during the portions of the TTI. The communications manager 815 may also transmit a PDCCH including DCI that schedules a TTI for a physical shared channel, determine one or more intervals that correspond to a periodic signal that collides with portions of the TTI, and communicate over the physical shared channel during the TTI, the TTI overlapping in time with the one or more intervals to allow communication of the periodic signal during the portions of the TTI. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

The communications manager 815 as described herein may be implemented to realize one or more potential improvements. One implementation may allow the device 805 to maintain efficient beam management in adverse link conditions. In some examples, techniques to maintain efficient beam management may result in a greater likelihood for successful communications with the device 805, which may increase the achievable throughput associated with the device 805 during poor network conditions compared to a device implementing alternative methods.

Further, based on periodically interrupting the TTI used to transmit or receive PUSCH, PDSCH, or PSSCH, the device 805 may reduce latency associated with transmitting beam management signals and/or latency associated with successfully receiving a message. Based on techniques for maintaining efficient beam management and the achievable throughput in poor network conditions and reducing latency, the device 805 may experience improved power savings and increase battery life.

For example, one or more processing units associated with beam management and transmitting or receiving messages may spend longer durations in a sleep mode (e.g., a micro sleep mode). Additionally or alternatively, the one or more processing units may perform various other processing tasks for the device 805, which may result in greater processing efficiency at the device 805.

Figure 9:
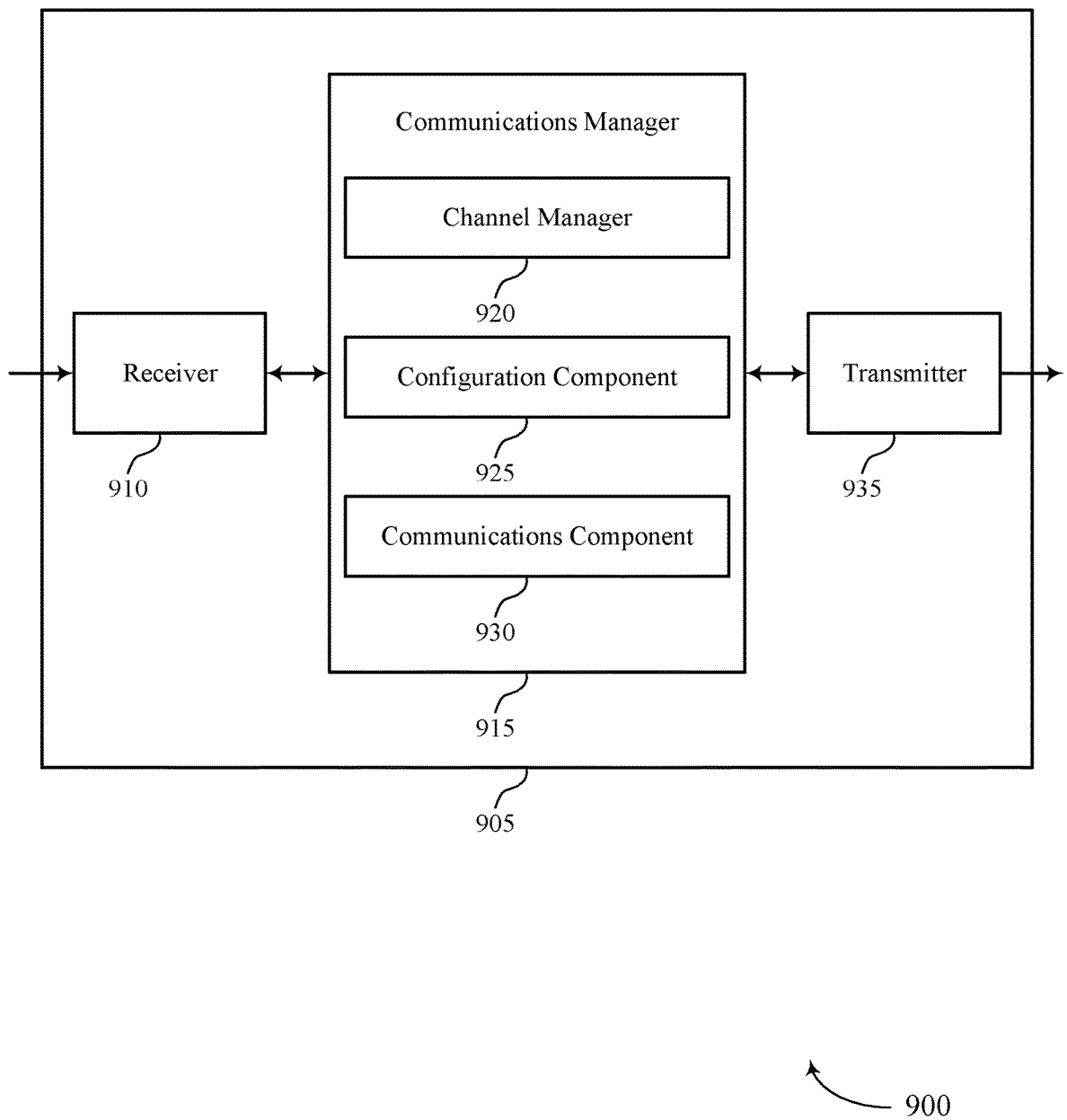

FIG. 9 shows a block diagram 900 of a device 905 that supports beam management for high-pathloss mode operations in accordance with one or more aspects of the present disclosure. The device 905 may be an example of aspects of a device 805, a UE 115, or a base station 105 as described herein. The device 905 may include a receiver 910, a communications manager 915, and a transmitter 935. The device 905 may also include a processor. Each of these components may be in communication with one another (e.g., via one or more buses).

Receiver 910 may receive information such as packets, user data, or control information associated with various information channels (e.g., control channels, data channels, and information related to beam management for high-pathloss mode operations, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a channel manager 920, a configuration component 925, and a communications component 930. The communications manager 915 may be an example of aspects of the communications manager 1110 or 1210 as described herein.

The channel manager 920 may receive a PDCCH including DCI that schedules a TTI for a physical shared channel (e.g., PDSCH, PUSCH). The configuration component 925 may determine one or more intervals that correspond to a periodic signal that collides with portions of the TTI. The communications component 930 may communicate over the physical shared channel during the TTI, the TTI overlapping in time with the one or more intervals to allow communication of the periodic signal during the portions of the TTI.

Additionally or alternatively, the channel manager 920 may transmit a PDCCH including DCI that schedules a TTI for a physical shared channel (e.g., PDSCH, PUSCH). The configuration component 925 may determine one or more intervals that correspond to a periodic signal that collides with portions of the TTI. The communications component 930 may communicate over the physical shared channel during the TTI, the TTI overlapping in time with the one or more intervals to allow communication of the periodic signal during the portions of the TTI.

Transmitter 935 may transmit signals generated by other components of the device 905. In some examples, the transmitter 935 may be collocated with a receiver 910 in a transceiver module. For example, the transmitter 935 may be an example of aspects of the transceiver 1120 or 1220 as described with reference to FIGS. 11 and 12. The transmitter 935 may utilize a single antenna or a set of antennas.

Figure 10:
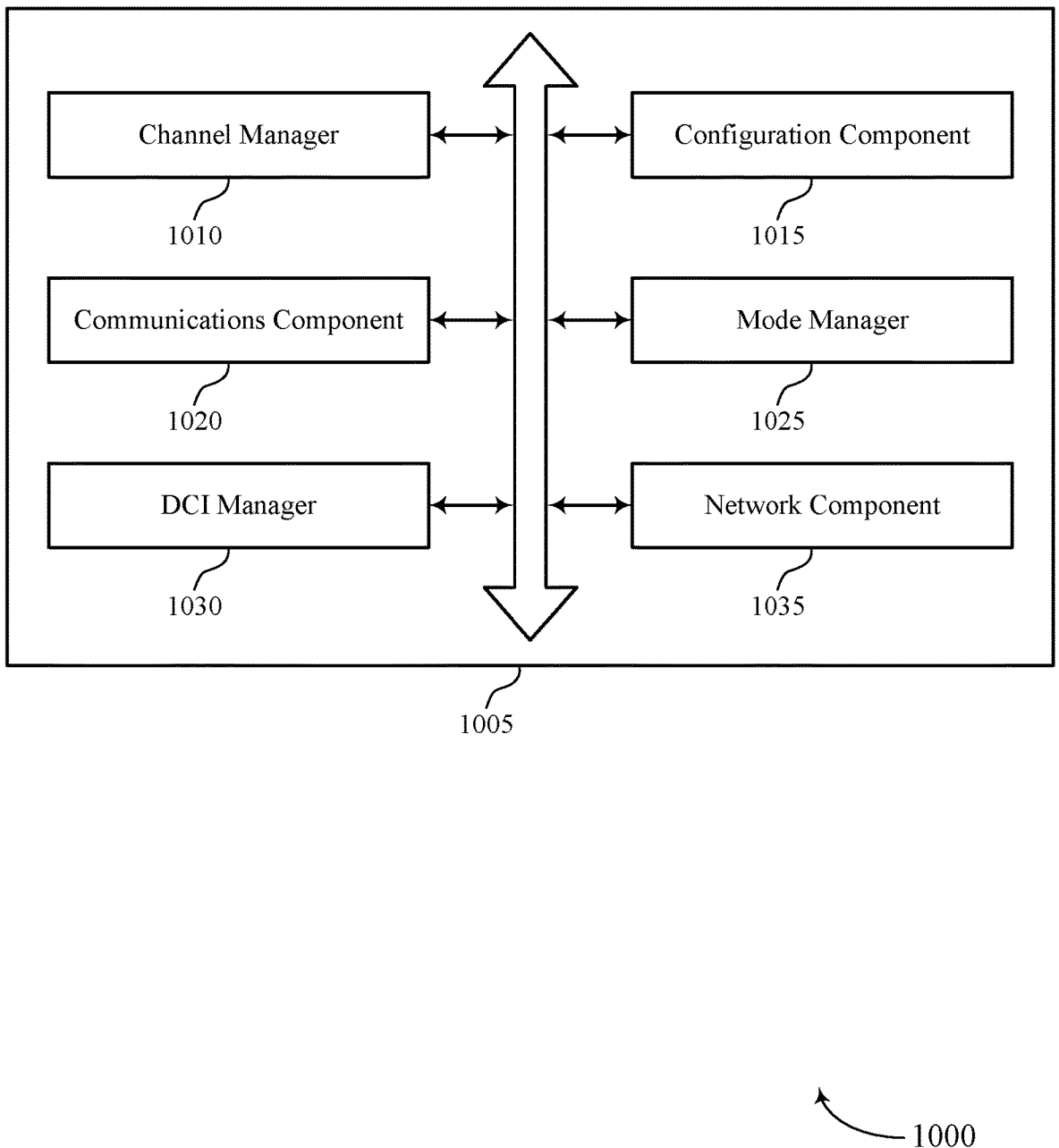
FIG. 10 shows a block diagram of a communications manager that supports beam management for high-pathloss mode operations in accordance with one or more aspects of the present disclosure.

FIG. 10 shows a block diagram 1000 of a communications manager 1005 that supports beam management for high-pathloss mode operations in accordance with one or more aspects of the present disclosure. The communications manager 1005 may be an example of aspects of a communications manager 815, a communications manager 915, or a communications manager 1110 described herein. The communications manager 1005 may include a channel manager 1010, a configuration component 1015, a communications component 1020, a mode manager 1025, a DCI manager 1030, and a network component 1035. Each of these modules may communicate, directly or indirectly, with one another (e.g., via one or more buses).

The channel manager 1010 may receive a PDCCH including DCI that schedules a TTI for a physical shared channel. In some examples, the channel manager 1010 may transmit a PDCCH including DCI that schedules a TTI for a physical shared channel. In some examples, the channel manager 1010 may transmit a PUSCH to another wireless device. In some examples, the channel manager 1010 may receive a PDSCH from another wireless device. In some examples, the channel manager 1010 may receive a PUSCH from another wireless device. In some examples, the channel manager 1010 may transmit a PDSCH to another wireless device. In some examples, the channel manager 1010 may transmit a PSSCH to another wireless device. In some examples, the channel manager 1010 may receive a PSSCH from another wireless device.

The configuration component 1015 may determine one or more intervals that correspond to a periodic signal that collides with portions of the TTI. In some examples, the configuration component 1015 may determine one or more intervals that correspond to a periodic signal that collides with portions of the TTI. In some examples, the configuration component 1015 may receive the periodic signal during each of the one or more intervals that overlap in time with the TTI. In some examples, the configuration component 1015 may transmit the periodic signal during each of the one or more intervals that overlap in time with the TTI.

In some examples, the configuration component 1015 may determine a configuration of the periodic signal, where the one or more intervals are identified based on the configuration. In some examples, the configuration component 1015 may receive, within the DCI, an MCS table that indicates the configuration. In some examples, the configuration component 1015 may receive RRC signaling that indicates the configuration. In some examples, the configuration component 1015 may transmit, to one or more other wireless devices, the periodic signal during each of the one or more intervals that overlap in time with the TTI. In some examples, the configuration component 1015 may receive, from another wireless device, the periodic signal during each of the one or more intervals that overlap in time with the TTI.

In some examples, the configuration component 1015 may determine a configuration of the periodic signal, where the one or more intervals are identified based on the configuration of the periodic signal. In some examples, the configuration component 1015 may generate an MCS table that indicates the configuration of the periodic signal. In some examples, the configuration component 1015 may transmit the MCS table within the DCI. In some examples, the configuration component 1015 may transmit RRC signaling that indicates the configuration of the periodic signal.

In some cases, each of the one or more intervals includes a time duration for communicating the periodic signal and a timing gap before and after the time duration. In some cases, the periodic signal includes an SSB, or a TRS, or a CSI-RS, or an SRS, or a combination thereof. In some cases, each of the one or more intervals includes a time duration for communicating the periodic signal and a timing gap before and after the time duration.

The communications component 1020 may communicate over the physical shared channel during the TTI, the TTI overlapping in time with the one or more intervals to allow communication of the periodic signal during the respective portions. In some examples, the communications component 1020 may communicate over the physical shared channel during the TTI, the TTI overlapping in time with the one or more intervals to allow communication of the periodic signal during the respective portions.

The mode manager 1025 may operate in a high-pathloss mode, where the TTI is overlapped in time with the one or more intervals based on operation in the high-pathloss mode. In some examples, the mode manager 1025 may operate in a high-pathloss mode, where the TTI is overlapped in time with the one or more intervals based on operation in the high-pathloss mode.

The DCI manager 1030 may determine a bit value within the DCI, where the TTI is overlapped in time with the one or more intervals based on the determined bit value. In some examples, the DCI manager 1030 may configure, within the DCI, a bit value that indicates whether the TTI is overlapped in time with the one or more intervals.

The network component 1035 may be a wireless device or a device in a wireless network. In some cases, the wireless device or the device in the wireless network may include a node in an IAB network.

Figure 11:
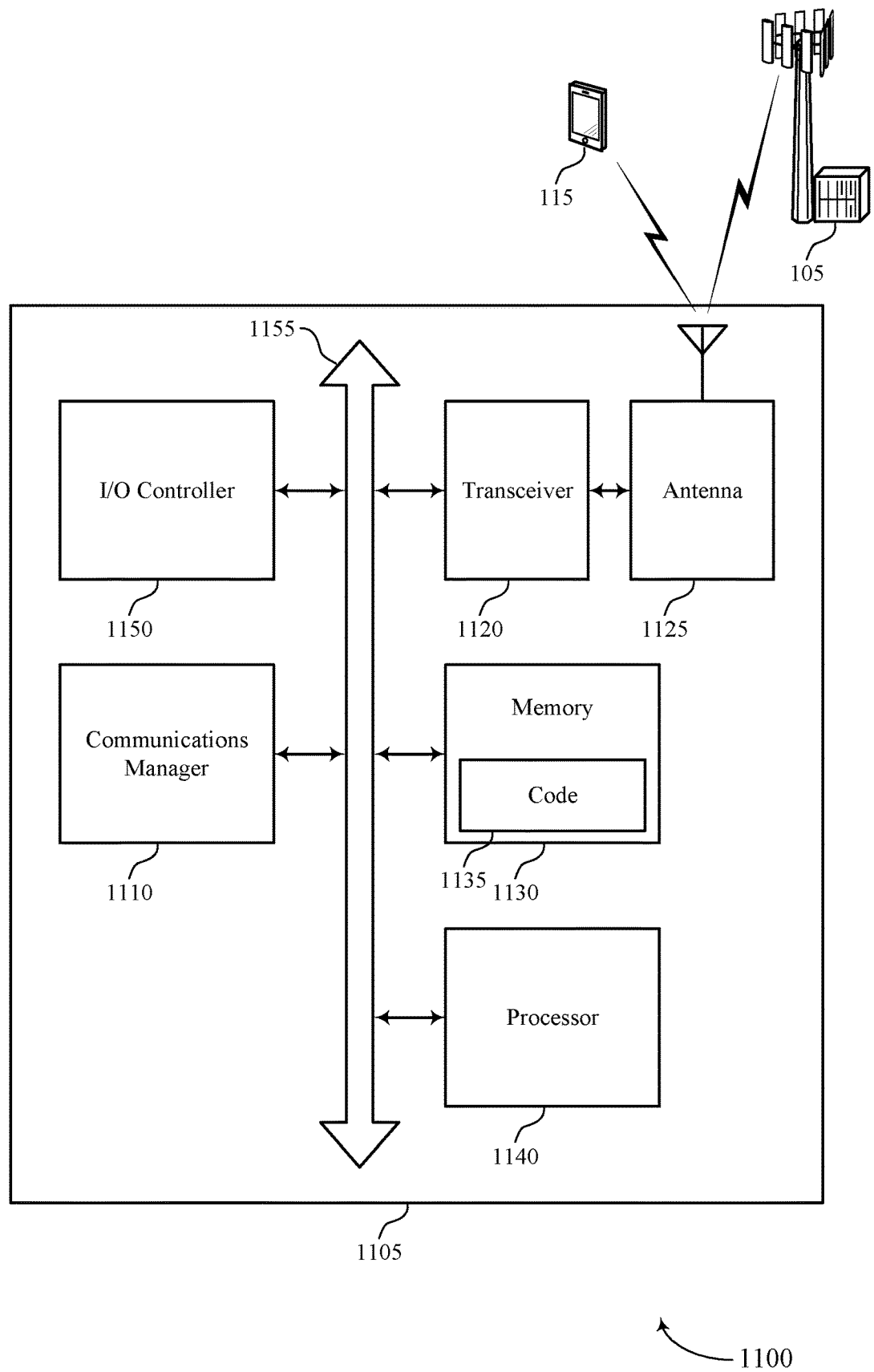
FIG. 11 shows a diagram of a system including a device that supports beam management for high-pathloss mode operations in accordance with one or more aspects of the present disclosure.

FIG. 11 shows a diagram of a system 1100 including a device 1105 that supports beam management for high-pathloss mode operations in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may receive a PDCCH including DCI that schedules a TTI for a physical shared channel, determine one or more intervals that correspond to a periodic signal that collides with portions of the TTI, and communicate over the physical shared channel during the TTI, the TTI overlapping in time with the one or more intervals to allow communication of the periodic signal during the portions of the TTI. The communications manager 1110 may also transmit a PDCCH including DCI that schedules a TTI for a physical shared channel, determine one or more intervals that correspond to a periodic signal that collides with portions of the TTI, and communicate over the physical shared channel during the TTI, the TTI overlapping in time with the one or more intervals to allow communication of the periodic signal during the portions of the TTI.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases, the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam management for high-pathloss mode operations).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
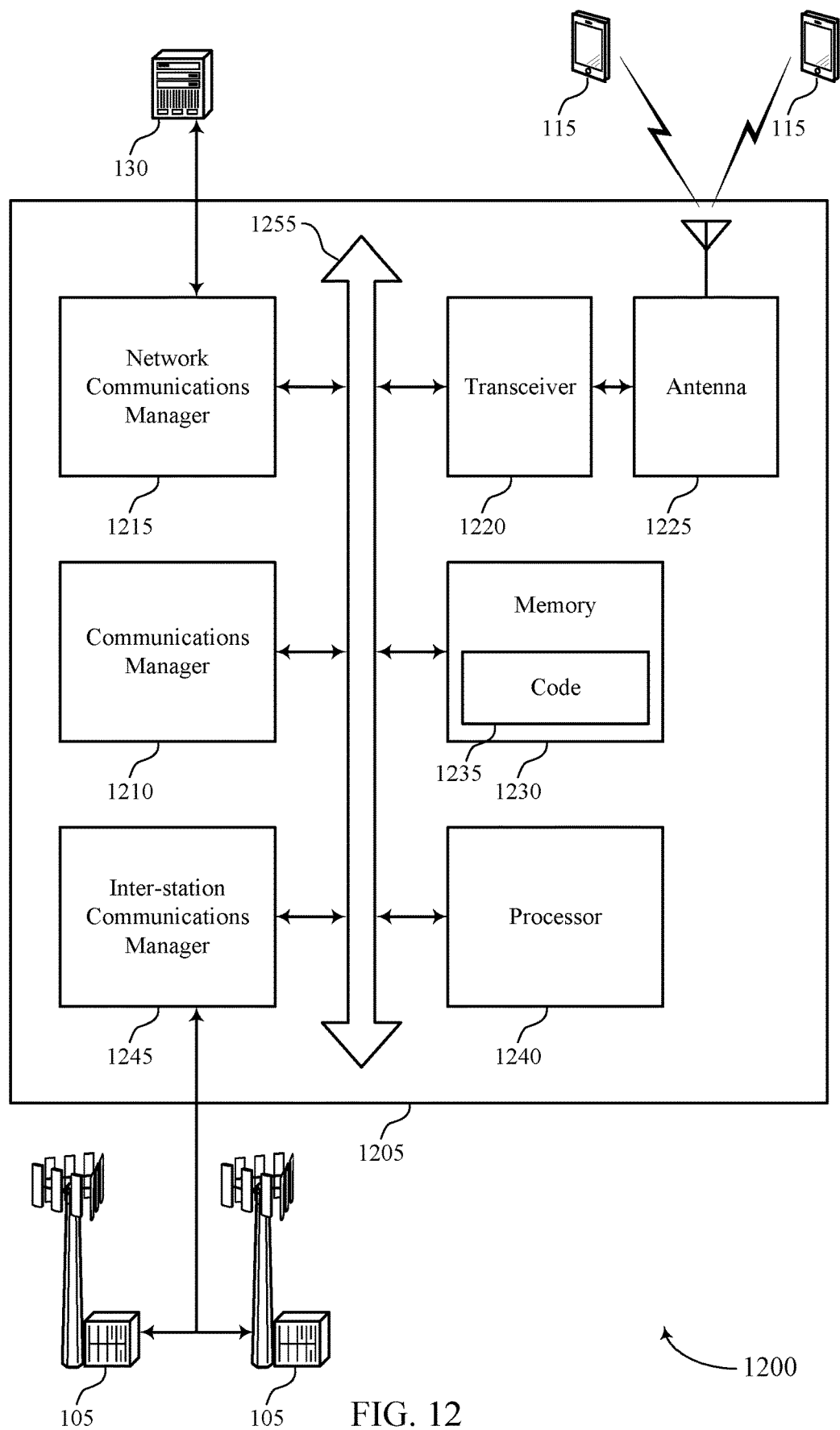
FIG. 12 shows a diagram of a system including a device that supports beam management for high-pathloss mode operations in accordance with one or more aspects of the present disclosure.

FIG. 12 shows a diagram of a system 1200 including a device 1205 that supports beam management for high-pathloss mode operations in accordance with one or more aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may receive a PDCCH including DCI that schedules a TTI for a physical shared channel, determine one or more intervals that correspond to a periodic signal that collides with portions of the TTI, and communicate over the physical shared channel during the TTI, the TTI overlapping in time with the one or more intervals to allow communication of the periodic signal during the portions of the TTI. The communications manager 1210 may also transmit a PDCCH including DCI that schedules a TTI for a physical shared channel, determine one or more intervals that correspond to a periodic signal that collides with portions of the TTI, and communicate over the physical shared channel during the TTI, the TTI overlapping in time with the one or more intervals to allow communication of the periodic signal during the portions of the TTI.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam management for high-pathloss mode operations).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
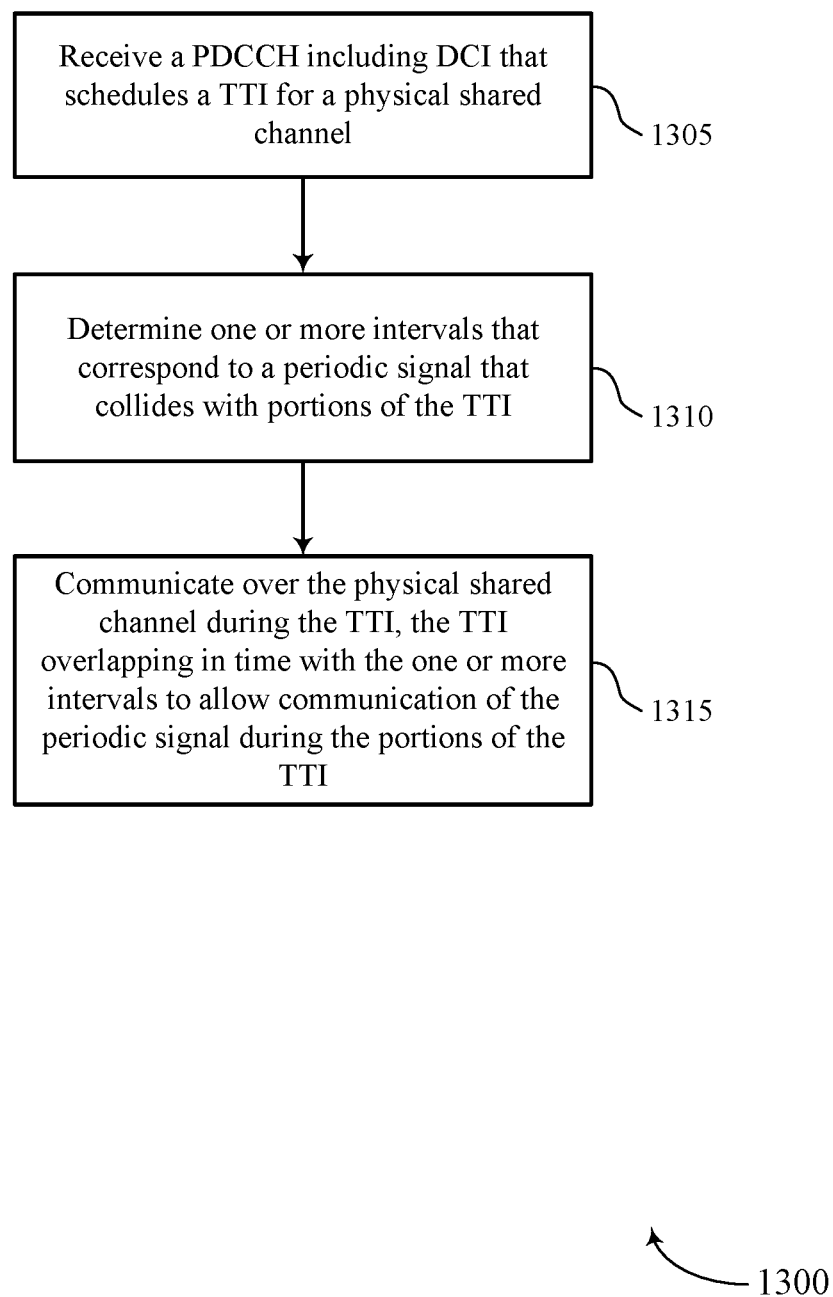
FIGS. 13 through 16 show flowcharts illustrating methods that support beam management for high-pathloss mode operations in accordance with one or more aspects of the present disclosure.

FIG. 13 shows a flowchart illustrating a method 1300 that supports beam management for high-pathloss mode operations in accordance with one or more aspects of the present disclosure. The operations of method 1300 may be implemented by wireless device, such as a UE 115 or base station 105, or its components as described herein. For example, the operations of method 1300 may be performed by a communications manager as described with reference to FIGS. 8 through 12. In some examples, a wireless device may execute a set of instructions to control the functional elements of the wireless device to perform the functions described herein. Additionally or alternatively, a wireless device may perform aspects of the functions described herein using special-purpose hardware.

At 1305, the wireless device may receive a PDCCH including DCI that schedules a TTI for a physical shared channel. The operations of 1305 may be performed according to the methods described herein. In some examples, aspects of the operations of 1305 may be performed by a channel manager as described with reference to FIGS. 8 through 12.

At 1310, the wireless device may determine one or more intervals that correspond to a periodic signal that collides with portions of the TTI. The operations of 1310 may be performed according to the methods described herein. In some examples, aspects of the operations of 1310 may be performed by a configuration component as described with reference to FIGS. 8 through 12.

At 1315, the wireless device may communicate over the physical shared channel during the TTI, the TTI overlapping in time with the one or more intervals to allow communication of the periodic signal during the portions of the TTI. The operations of 1315 may be performed according to the methods described herein. In some examples, aspects of the operations of 1315 may be performed by a communications component as described with reference to FIGS. 8 through 12.

Figure 14:
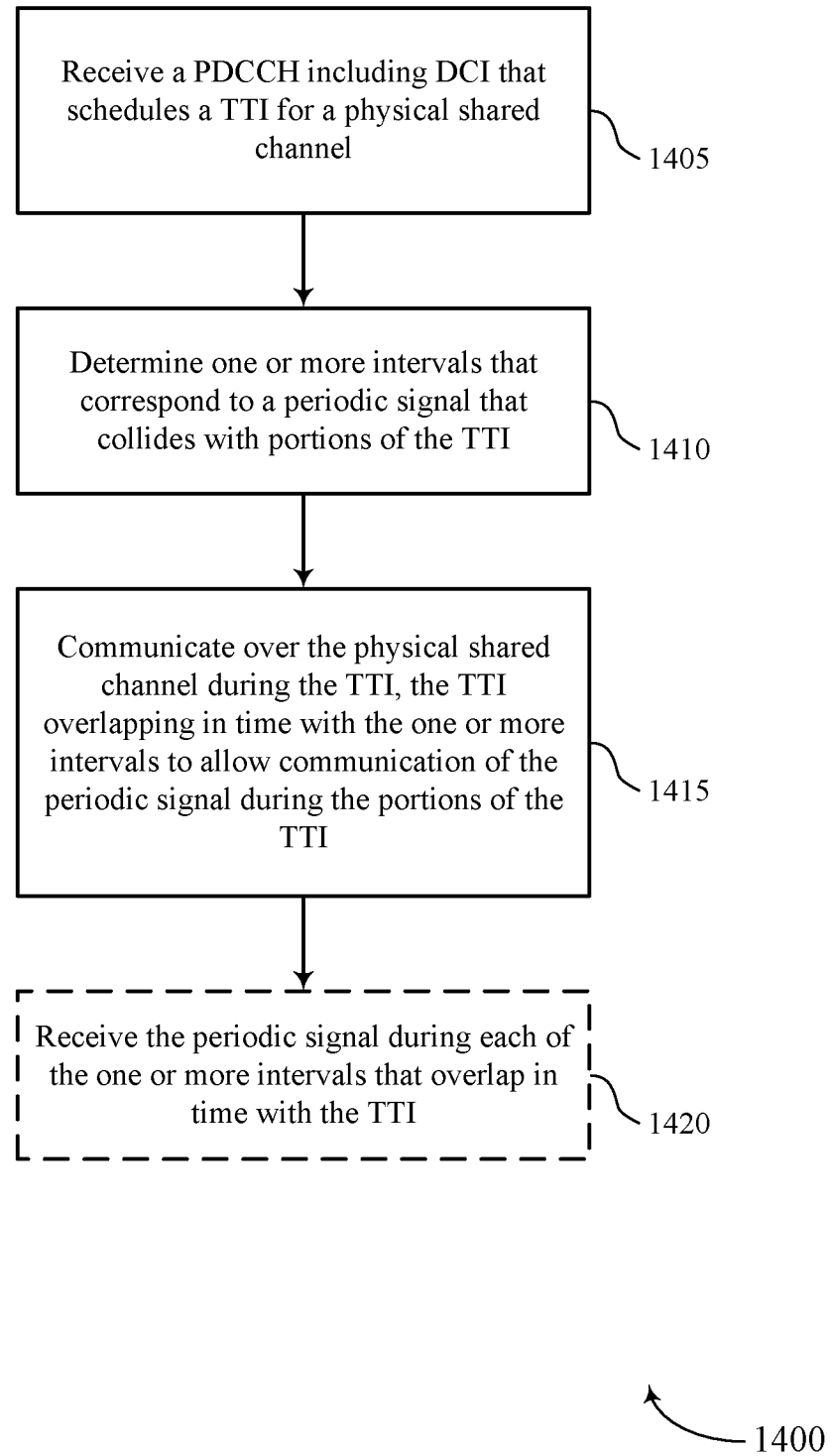

FIG. 14 shows a flowchart illustrating a method 1400 that supports beam management for high-pathloss mode operations in accordance with one or more aspects of the present disclosure. The operations of method 1400 may be implemented by wireless device, such as a UE 115 or base station 105, or its components as described herein. For example, the operations of method 1400 may be performed by a communications manager as described with reference to FIGS. 8 through 12. In some examples, a wireless device may execute a set of instructions to control the functional elements of the wireless device to perform the functions described herein. Additionally or alternatively, a wireless device may perform aspects of the functions described herein using special-purpose hardware.

At 1405, the wireless device may receive a PDCCH including DCI that schedules a TTI for a physical shared channel. The operations of 1405 may be performed according to the methods described herein. In some examples, aspects of the operations of 1405 may be performed by a channel manager as described with reference to FIGS. 8 through 12.

At 1410, the wireless device may determine one or more intervals that correspond to a periodic signal that collides with portions of the TTI. The operations of 1410 may be performed according to the methods described herein. In some examples, aspects of the operations of 1410 may be performed by a configuration component as described with reference to FIGS. 8 through 12.

At 1415, the wireless device may communicate over the physical shared channel during the TTI, the TTI overlapping in time with the one or more intervals to allow communication of the periodic signal during the portions of the TTI. The operations of 1415 may be performed according to the methods described herein. In some examples, aspects of the operations of 1415 may be performed by a communications component as described with reference to FIGS. 8 through 12.

At 1420, the wireless device may optionally receive the periodic signal during each of the one or more intervals that overlap in time with the TTI. The operations of 1420 may be performed according to the methods described herein. In some examples, aspects of the operations of 1420 may be performed by a configuration component as described with reference to FIGS. 8 through 12.

Figure 15:
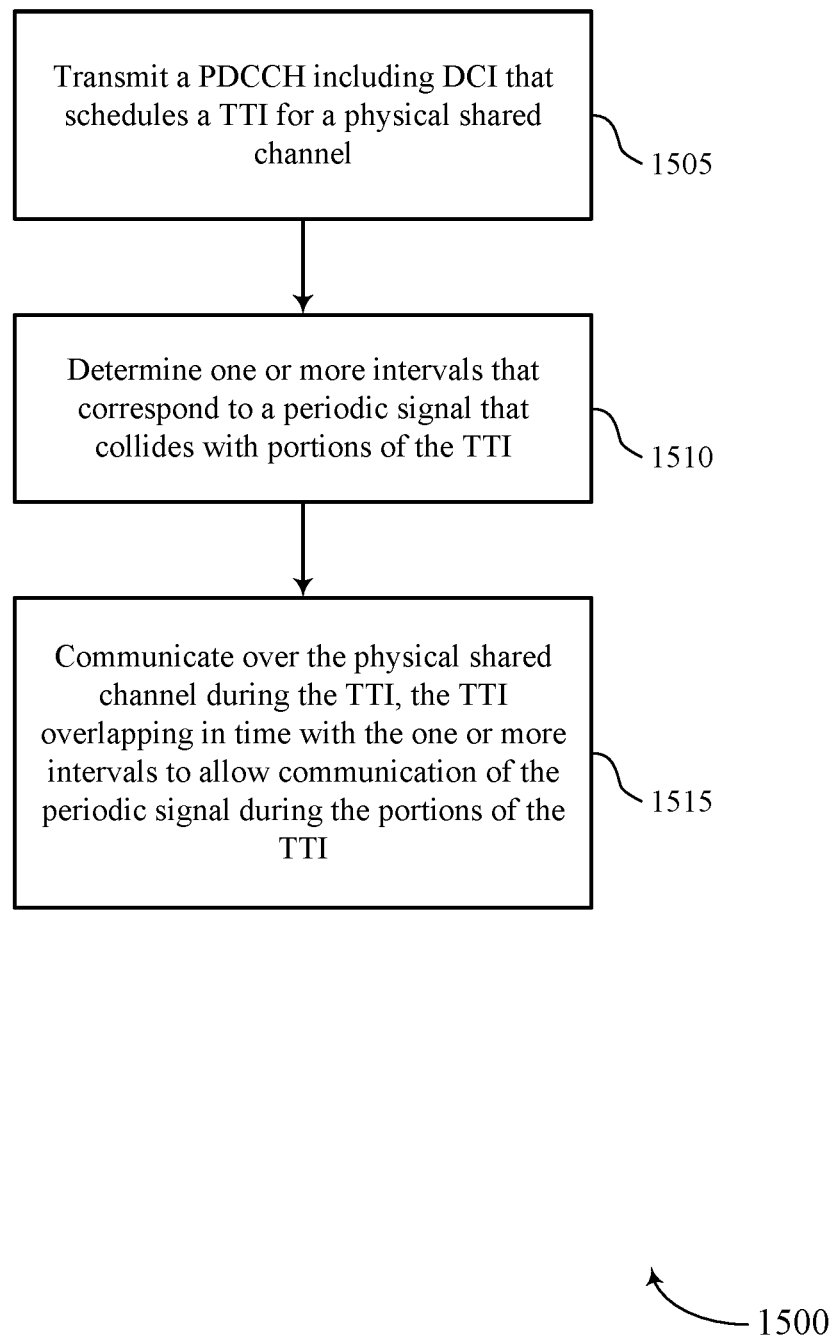

FIG. 15 shows a flowchart illustrating a method 1500 that supports beam management for high-pathloss mode operations in accordance with one or more aspects of the present disclosure. The operations of method 1500 may be implemented by a wireless device, such as a UE 115 or base station 105, or its components as described herein. For example, the operations of method 1500 may be performed by a communications manager as described with reference to FIGS. 8 through 12. In some examples, a wireless device may execute a set of instructions to control the functional elements of the wireless device to perform the functions described herein. Additionally or alternatively, a wireless device may perform aspects of the functions described herein using special-purpose hardware.

At 1505, the wireless device may transmit a PDCCH including DCI that schedules a TTI for a physical shared channel. The operations of 1505 may be performed according to the methods described herein. In some examples, aspects of the operations of 1505 may be performed by a channel manager as described with reference to FIGS. 8 through 12.

At 1510, the wireless device may determine one or more intervals that correspond to a periodic signal that collides with portions of the TTI. The operations of 1510 may be performed according to the methods described herein. In some examples, aspects of the operations of 1510 may be performed by a configuration component as described with reference to FIGS. 8 through 12.

At 1515, the wireless device may communicate over the physical shared channel during the TTI, the TTI overlapping in time with the one or more intervals to allow communication of the periodic signal during the portions of the TTI. The operations of 1515 may be performed according to the methods described herein. In some examples, aspects of the operations of 1515 may be performed by a communications component as described with reference to FIGS. 8 through 12.

Figure 16:
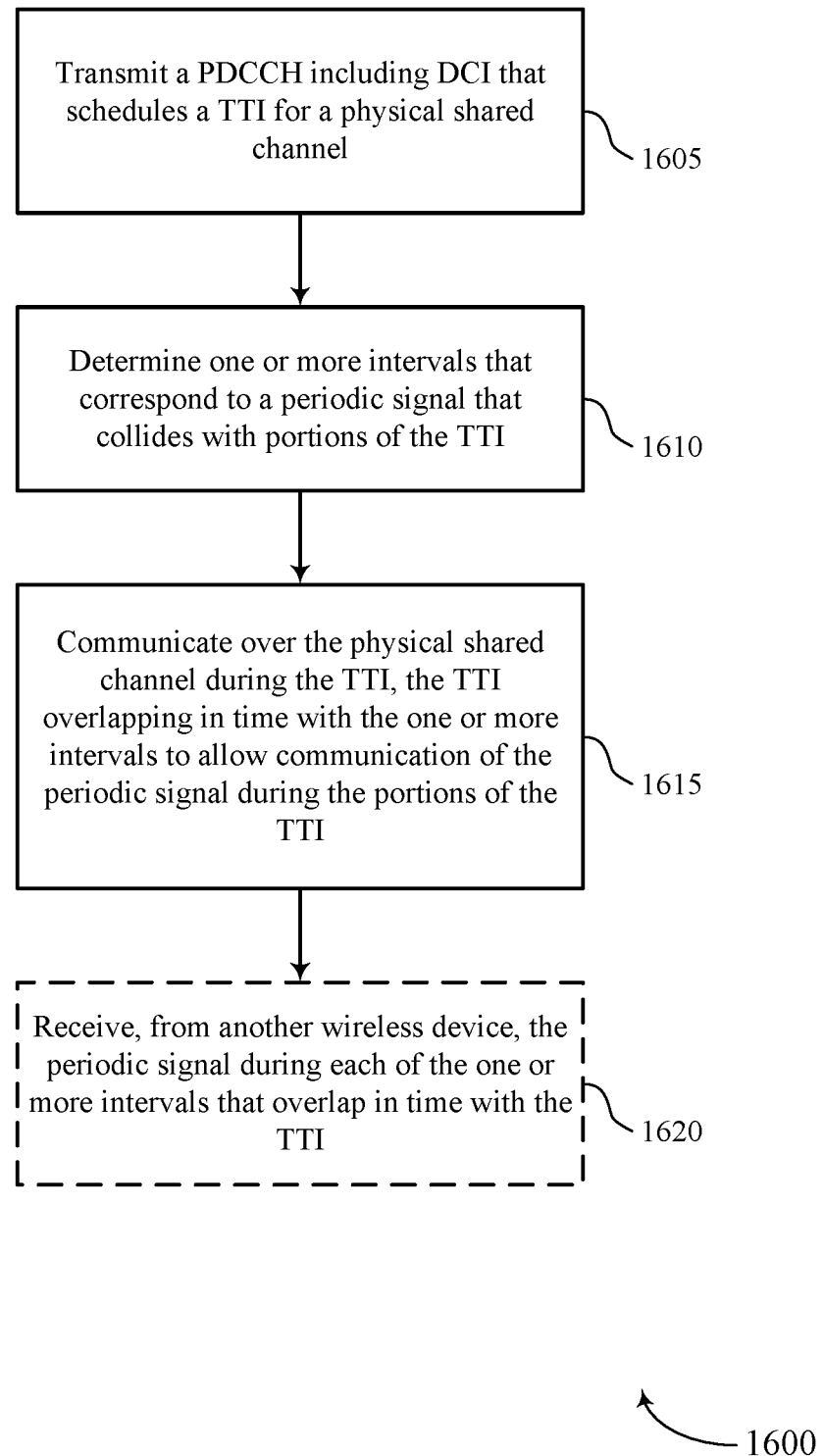

FIG. 16 shows a flowchart illustrating a method 1600 that supports beam management for high-pathloss mode operations in accordance with one or more aspects of the present disclosure. The operations of method 1600 may be implemented by a wireless device, such as a UE 115 or base station 105, or its components as described herein. For example, the operations of method 1600 may be performed by a communications manager as described with reference to FIGS. 8 through 12. In some examples, a wireless device may execute a set of instructions to control the functional elements of the wireless device to perform the functions described herein. Additionally or alternatively, a wireless device may perform aspects of the functions described herein using special-purpose hardware.

At 1605, the wireless device may transmit a PDCCH including DCI that schedules a TTI for a physical shared channel. The operations of 1605 may be performed according to the methods described herein. In some examples, aspects of the operations of 1605 may be performed by a channel manager as described with reference to FIGS. 8 through 12.

At 1610, the wireless device may determine one or more intervals that correspond to a periodic signal that collides with portions of the TTI. The operations of 1610 may be performed according to the methods described herein. In some examples, aspects of the operations of 1610 may be performed by a configuration component as described with reference to FIGS. 8 through 12.

At 1615, the wireless device may communicate over the physical shared channel during the TTI, the TTI overlapping in time with the one or more intervals to allow communication of the periodic signal during the portions of the TTI. The operations of 1615 may be performed according to the methods described herein. In some examples, aspects of the operations of 1615 may be performed by a communications component as described with reference to FIGS. 8 through 12.

At 1620, the wireless device may optionally receive, from another wireless device, the periodic signal during each of the one or more intervals that overlap in time with the TTI. The operations of 1620 may be performed according to the methods described herein. In some examples, aspects of the operations of 1620 may be performed by a configuration component as described with reference to FIGS. 8 through 12.

It should be noted that the methods described herein describe possible implementations, and that the operations may be rearranged or otherwise modified and that other implementations are possible. Further, aspects from two or more of the methods may be combined.

The following examples are given by way of illustration. Aspects of the following examples may be combined with aspects shown or discussed in relation to the figures or elsewhere herein.

Example 1

A method of wireless communications at a device in a wireless network, comprising: receiving a PDCCH comprising DCI that schedules a TTI for a physical shared channel, determining one or more intervals that correspond to a periodic signal that collides with portions of the TTI, and communicating over the physical shared channel during the TTI, the TTI overlapping in time with the one or more intervals to allow communication of the periodic signal during the portions of the TTI.

Example 2

The method of example 1, further comprising: receiving the periodic signal during each of the one or more intervals that overlap in time with the TTI.

Example 3

The method of example 1, further comprising: transmitting the periodic signal during each of the one or more intervals that overlap in time with the TTI.

Example 4

The method of any of examples 1 to 3, further comprising: determining a configuration of the periodic signal, wherein the one or more intervals are identified based at least in part on the configuration.

Example 5

The method of example 4, further comprising: receiving, within the DCI, an MCS table that indicates the configuration.

Example 6

The method of example 4, further comprising: receiving RRC signaling that indicates the configuration.

Example 7

The method of any of examples 1 to 6, further comprising: operating in a high-pathloss mode, wherein the TTI is overlapped in time with the one or more intervals based at least in part on operation in the high-pathloss mode.

Example 8

The method of any of examples 1 to 7, further comprising: determining a bit value within the DCI, wherein the TTI is overlapped in time with the one or more intervals based at least in part on the determined bit value.

Example 9

The method of any of examples 1 to 8, wherein communicating over the physical shared channel during the TTI comprises: transmitting a PUSCH to another wireless device.

Example 10

The method of any of examples 1 to 8, wherein communicating over the physical shared channel during the TTI comprises: transmitting a PSSCH to another wireless device.

Example 11

The method of any of examples 1 to 8, wherein communicating over the physical shared channel during the TTI comprises: transmitting a PDSCH to another wireless device.

Example 12

The method of any of examples 1 to 8, wherein communicating over the physical shared channel during the TTI comprises: receiving a PDSCH from another wireless device.

Example 13

The method of any of examples 1 to 8, wherein communicating over the physical shared channel during the TTI comprises: receiving a PSSCH from another wireless device.

Example 14

The method of any of examples 1 to 8, wherein communicating over the physical shared channel during the TTI comprises: receiving a PUSCH from another wireless device.

Example 15

The method of any of examples 1 to 14, wherein each of the one or more intervals comprises a time duration for communicating the periodic signal and a timing gap before and after the time duration.

Example 16

The method of any of examples 1 to 15, wherein the periodic signal comprises an SSB, or a TRS, or a CSI-RS, or an SRS, or a combination thereof.

Example 17

The method of any of examples 1 to 16, wherein the device in the wireless network comprises a node in an IAB network.

Example 18

A method for wireless communications at a device in a wireless network, comprising: transmitting a PDCCH comprising DCI that schedules a TTI for a physical shared channel, determining one or more intervals that correspond to a periodic signal that collides with portions of the TTI, and communicating over the physical shared channel during the TTI, the TTI overlapping in time with the one or more intervals to allow communication of the periodic signal during the portions of the TTI.

Example 19

The method of example 18, further comprising: transmitting, to one or more other wireless devices, the periodic signal during each of the one or more intervals that overlap in time with the TTI.

Example 20

The method of example 18, further comprising: receiving, from another wireless device, the periodic signal during each of the one or more intervals that overlap in time with the TTI.

Example 21

The method of any of examples 18 to 20, further comprising: determining a configuration of the periodic signal, wherein the one or more intervals are identified based at least in part on the configuration of the periodic signal.

Example 22

The method of any of examples 18 to 21, further comprising: generating an MCS table that indicates the configuration of the periodic signal and transmitting the MCS table within the DCI.

Example 23

The method of any of examples 18 to 21, further comprising: transmitting RRC signaling that indicates the configuration of the periodic signal.

Example 24

The method of any of examples 18 to 23, further comprising: operating in a high-pathloss mode, wherein the TTI is overlapped in time with the one or more intervals based at least in part on operation in the high-pathloss mode.

Example 25

The method of any of examples 18 to 24, further comprising: configuring, within the DCI, a bit value that indicates whether the TTI is overlapped in time with the one or more intervals.

Example 26

The method of any of examples 18 to 25, wherein communicating over the physical shared channel during the TTI comprises: receiving a PUSCH from another wireless device.

Example 27

The method of any of examples 18 to 25, wherein communicating over the physical shared channel during the TTI comprises: receiving a PSSCH from another wireless device.

Example 28

The method of any of examples 18 to 25, wherein communicating over the physical shared channel during the TTI comprises: receiving a PDSCH from another wireless device.

Example 29

The method of any of examples 18 to 25, wherein communicating over the physical shared channel during the TTI comprises: transmitting a PDSCH to another wireless device.

Example 30

The method of any of examples 18 to 25, wherein communicating over the physical shared channel during the TTI comprises: transmitting a PSSCH to another wireless device.

Example 30

The method of any of examples 18 to 25, wherein communicating over the physical shared channel during the TTI comprises: transmitting a PUSCH to another wireless device.

Example 31

The method of any of examples 18 to 30, wherein each of the one or more intervals comprises a time duration for communicating the periodic signal and a timing gap before and after the time duration.

Example 32

The method of any of examples 18 to 31, wherein the device in the wireless network comprises a node in an IAB network.

Example 33

An apparatus comprising at least one means for performing a method of any of examples 1 to 17.

Example 34

An apparatus for wireless communications comprising a processor and memory coupled to the processor, the processor and memory configured to perform a method of any of examples 1 to 17.

Example 35

A non-transitory computer-readable medium storing code for wireless communications, the code comprising instructions executable by a processor to perform a method of any of examples 1 to 17.

Example 36

An apparatus comprising at least one means for performing a method of any of examples 18 to 32.

Example 37

An apparatus for wireless communications comprising a processor and memory coupled to the processor, the processor and memory configured to perform a method of any of examples 18 to 32.

Example 38

A non-transitory computer-readable medium storing code for wireless communications, the code comprising instructions executable by a processor to perform a method of any of examples 18 to 32.

Aspects of these examples may be combined with aspects disclosed in other implementations.

Techniques described herein may be used for various wireless communications systems such as CDMA, TDMA, FDMA, orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a device in a wireless network, comprising:
   receiving a physical downlink control channel comprising downlink control information that schedules one transmission time interval for a physical shared channel;
   communicating over the physical shared channel during a portion of the one transmission time interval excluding one or more intervals in time that correspond to a periodic signal, the one transmission time interval overlapping in time with the one or more intervals to allow communication of the periodic signal during the one or more intervals; and
   communicating the periodic signal during each of the one or more intervals that overlap with the one transmission time interval.

2. The method of claim 1, the communicating the periodic signal comprising:
   receiving the periodic signal during each of the one or more intervals that overlap in time with the one transmission time interval.

3. The method of claim 1, the communicating the periodic signal comprising:
   transmitting the periodic signal during each of the one or more intervals that overlap in time with the one transmission time interval.

4. The method of claim 1, further comprising:
   determining a configuration of the periodic signal, wherein the one or more intervals are based at least in part on the configuration.

5. The method of claim 4, further comprising:
   receiving, within the downlink control information, a modulation and coding scheme table that indicates the configuration.

6. The method of claim 4, further comprising:
   receiving radio resource control signaling that indicates the configuration.

7. The method of claim 1, further comprising:
   operating in a high-pathloss mode, wherein the one transmission time interval is overlapped in time with the one or more intervals based at least in part on operation in the high-pathloss mode.

8. The method of claim 1, further comprising:
   determining a bit value within the downlink control information, wherein the one transmission time interval is overlapped in time with the one or more intervals based at least in part on the determined bit value.

9. The method of claim 1, the communicating over the physical shared channel during the one transmission time interval comprising:
   transmitting a physical uplink shared channel to another wireless device.

10. The method of claim 1, the communicating over the physical shared channel during the one transmission time interval comprising:
    transmitting a physical sidelink shared channel to another wireless device.

11. The method of claim 1, the communicating over the physical shared channel during the one transmission time interval comprising:
    transmitting a physical downlink shared channel to another wireless device.

12. The method of claim 1, the communicating over the physical shared channel during the one transmission time interval comprising:
    receiving a physical downlink shared channel from another wireless device.

13. The method of claim 1, the communicating over the physical shared channel during the one transmission time interval comprising:
    receiving a physical sidelink shared channel from another wireless device.

14. The method of claim 1, the communicating over the physical shared channel during the one transmission time interval comprising:
    receiving a physical uplink shared channel from another wireless device.

15. The method of claim 1, wherein the device in the wireless network comprises a node in an integrated access and backhaul network.

16. A method for wireless communications at a device in a wireless network, comprising:
    transmitting a physical downlink control channel comprising downlink control information that schedules one transmission time interval for a physical shared channel;
    communicating over the physical shared channel during a portion of the one transmission time interval excluding one or more intervals in time that correspond to a periodic signal, the one transmission time interval overlapping in time with the one or more intervals to allow communication of the periodic signal during the one or more intervals; and communicating the periodic signal during each of the one or more intervals that overlap with the one transmission time interval.

17. The method of claim 16, the communicating the periodic signal comprising:
transmitting, to one or more other wireless devices, the periodic signal during each of the one or more intervals that overlap in time with the one transmission time interval.

18. The method of claim 16, the communicating the periodic signal comprising:
receiving, from another wireless device, the periodic signal during each of the one or more intervals that overlap in time with the one transmission time interval.

19. The method of claim 16, further comprising:
determining a configuration of the periodic signal, wherein the one or more intervals are based at least in part on the configuration of the periodic signal.

20. The method of claim 19, further comprising:
generating a modulation and coding scheme table that indicates the configuration of the periodic signal; and
transmitting the modulation and coding scheme table within the downlink control information.

21. The method of claim 16, further comprising:
operating in a high-pathloss mode, wherein the one transmission time interval is overlapped in time with the one or more intervals based at least in part on operation in the high-pathloss mode.

22. The method of claim 16, the communicating over the physical shared channel during the one transmission time interval comprising:
receiving a physical uplink shared channel from another wireless device.

23. The method of claim 16, the communicating over the physical shared channel during the one transmission time interval comprising:
receiving a physical sidelink shared channel from another wireless device.

24. The method of claim 16, the communicating over the physical shared channel during the one transmission time interval comprising:
receiving a physical downlink shared channel from another wireless device.

25. The method of claim 16, the communicating over the physical shared channel during the one transmission time interval comprising:
transmitting a physical downlink shared channel to another wireless device.

26. The method of claim 16, the communicating over the physical shared channel during the one transmission time interval comprising:
transmitting a physical sidelink shared channel to another wireless device.

27. The method of claim 16, the communicating over the physical shared channel during the one transmission time interval comprising:
transmitting a physical uplink shared channel to another wireless device.

28. The method of claim 16, wherein the device in the wireless network comprises a node in an integrated access and backhaul network.

29. An apparatus for wireless communication, comprising:
a processor; and
memory coupled to the processor, the processor configured to:
receive a physical downlink control channel comprising downlink control information that schedules one transmission time interval for a physical shared channel;
communicate over the physical shared channel during a portion of the one transmission time interval excluding one or more intervals in time that correspond to a periodic signal, the one transmission time interval overlapping in time with the one or more intervals to allow communication of the periodic signal during the one or more intervals; and
communicate the periodic signal during each of the one or more intervals that overlap with the one transmission time interval.

30. The apparatus of claim 29, the processor further configured to:
determine a configuration of the periodic signal, wherein the one or more intervals are based at least in part on the configuration.

31. The apparatus of claim 30, the processor further configured to:
receive, within the downlink control information, a modulation and coding scheme table that indicates the configuration.

32. The apparatus of claim 30, the processor further configured to:
receive radio resource control signaling that indicates the configuration.

33. The apparatus of claim 29, the processor further configured to:
operate in a high-pathloss mode, wherein the one transmission time interval is overlapped in time with the one or more intervals based at least in part on operation in the high-pathloss mode.

34. The apparatus of claim 29, the processor further configured to:
determine a bit value within the downlink control information, wherein the one transmission time interval is overlapped in time with the one or more intervals based at least in part on the determined bit value.

35. The apparatus of claim 29, further comprising:
an antenna array configured to:
receive the periodic signal during each of the one or more intervals that overlap in time with the one transmission time interval.

36. The apparatus of claim 29, further comprising:
an antenna array configured to:
transmit the periodic signal during each of the one or more intervals that overlap in time with the one transmission time interval.

37. An apparatus for wireless communication, comprising:
a processor; and
memory coupled to the processor, the processor configured to:
transmit a physical downlink control channel comprising downlink control information that schedules one transmission time interval for a physical shared channel;
communicate over the physical shared channel during a portion of the one transmission time interval excluding one or more intervals in time that correspond to a periodic signal, the one transmission time interval overlapping in time with the one or more intervals to allow communication of the periodic signal during the one or more intervals; and communicate the periodic signal during each of the one or more intervals that overlap with the one transmission time interval.

38. The apparatus of claim 37, the processor further configured to:

determine a configuration of the periodic signal, wherein the one or more intervals are based at least in part on the configuration.

39. The apparatus of claim 38, the processor further configured to:

generate a modulation and coding scheme table that indicates the configuration of the periodic signal; and transmit the modulation and coding scheme table within the downlink control information.

40. The apparatus of claim 37, the processor further configured to:

operate in a high-pathloss mode, wherein the one transmission time interval is overlapped in time with the one or more intervals based at least in part on operation in the high-pathloss mode.

41. The apparatus of claim 37, further comprising:

an antenna array configured to:

transmit, to one or more other wireless devices, the periodic signal during each of the one or more intervals that overlap in time with the one transmission time interval.

42. The apparatus of claim 37, further comprising:

an antenna array configured to:

receive, from another wireless device, the periodic signal during each of the one or more intervals that overlap in time with the one transmission time interval.

43. A non-transitory computer-readable medium storing code for wireless communication, the code comprising instructions executable by a processor to:

receive a physical downlink control channel comprising downlink control information that schedules one transmission time interval for a physical shared channel;

communicate over the physical shared channel during a portion of the one transmission time interval excluding one or more intervals in time that correspond to a periodic signal, the one transmission time interval overlapping in time with the one or more intervals to allow communication of the periodic signal during the one or more intervals; and communicate the periodic signal during each of the one or more intervals that overlap with the one transmission time interval.

44. The non-transitory computer-readable medium of claim 43, the instructions further executable by the processor to:

determine a configuration of the periodic signal, wherein the one or more intervals are based at least in part on the configuration.

45. The non-transitory computer-readable medium of claim 43, the instructions further executable by the processor to:

operate in a high-pathloss mode, wherein the one transmission time interval is overlapped in time with the one or more intervals based at least in part on operation in the high-pathloss mode.

46. The non-transitory computer-readable medium of claim 43, the instructions further executable by the processor to:

determine a bit value within the downlink control information, wherein the one transmission time interval is overlapped in time with the one or more intervals based at least in part on the determined bit value.

47. A non-transitory computer-readable medium storing code for wireless communication, the code comprising instructions executable by a processor to:

transmit a physical downlink control channel comprising downlink control information that schedules one transmission time interval for a physical shared channel;

communicate over the physical shared channel during a portion of the one transmission time interval excluding one or more intervals in time that correspond to a periodic signal, the one transmission time interval overlapping in time with the one or more intervals to allow communication of the periodic signal during the one or more intervals; and communicate the periodic signal during each of the one or more intervals that overlap with the one transmission time interval.

48. The non-transitory computer-readable medium of claim 47, the instructions further executable by the processor to:

determine a configuration of the periodic signal, wherein the one or more intervals are based at least in part on the configuration.

49. The non-transitory computer-readable medium of claim 47, the instructions further executable by the processor to:

operate in a high-pathloss mode, wherein the one transmission time interval is overlapped in time with the one or more intervals based at least in part on operation in the high-pathloss mode.

* * * * *